United States Patent
Quiroga

[11] Patent Number: 6,038,842
[45] Date of Patent: *Mar. 21, 2000

[54] ROTARY MOWER APPARATUS

[76] Inventor: Osvaldo R. Quiroga, Casilla de Correo 1286, Cochabamba, Bolivia

[*] Notice: This patent is subject to a terminal disclaimer.

[21] Appl. No.: 09/090,813

[22] Filed: Jun. 4, 1998

Related U.S. Application Data

[63] Continuation-in-part of application No. 08/607,158, Feb. 26, 1996, Pat. No. 5,761,892.

[51] Int. Cl.⁷ .............................. A01D 34/44; A01D 34/73
[52] U.S. Cl. ................................ 56/17.5; 56/255; 56/295; 56/DIG. 20; 56/6
[58] Field of Search ............................... 56/6, 16.7, 17.5, 56/255, 295, DIG. 17, DIG. 20

[56] References Cited

U.S. PATENT DOCUMENTS

| | | |
|---|---|---|
| 5,931 | 11/1848 | Boone . |
| 162,082 | 4/1875 | Lorey . |
| 431,836 | 7/1890 | Bockus . |
| 578,666 | 3/1897 | Thornburg . |
| 597,972 | 1/1898 | Graham . |
| 703,513 | 7/1902 | Adams et al. . |
| 806,780 | 12/1905 | Dain . |
| 1,351,185 | 8/1920 | Muzzy . |
| 1,368,503 | 2/1921 | Kallauner . |
| 1,576,878 | 3/1926 | Thynne . |
| 2,032,701 | 3/1936 | Jones . |
| 2,149,463 | 3/1939 | Orr . |
| 2,190,578 | 2/1940 | Todd . |
| 2,592,269 | 4/1952 | Getz . |
| 2,633,688 | 4/1953 | Yeck et al. . |
| 2,642,711 | 6/1953 | Smith et al. . |
| 2,720,071 | 10/1955 | Watanabe . |
| 2,737,772 | 3/1956 | Jacobsen . |
| 2,801,513 | 8/1957 | Olson . |
| 2,916,867 | 12/1959 | Chadwick . |
| 2,924,259 | 2/1960 | Beeston, Jr. ............................. 56/295 |
| 2,931,156 | 4/1960 | Fulwider . |
| 2,942,397 | 6/1960 | Clark . |

(List continued on next page.)

FOREIGN PATENT DOCUMENTS

| | | |
|---|---|---|
| 0095728 A2 | 12/1983 | European Pat. Off. . |
| 2606585 A1 | 5/1988 | France . |
| 2435106 A1 | 2/1976 | Germany . |
| 3341040 A1 | 5/1985 | Germany . |
| 29502113 U1 | 11/1995 | Germany . |
| 2061687 | 5/1981 | United Kingdom . |
| WO 88/05255 | 7/1988 | WIPO . |
| WO 96/29853 | 10/1996 | WIPO . |

*Primary Examiner*—James A. Lisehora
*Attorney, Agent, or Firm*—Jeffrey L. Thompson; Thompson & Thompson, P.A.

[57] ABSTRACT

A rotary blade assembly for a rotary mower that provides an equivalent cut with a substantial reduction in necessary driving power, and a method of implementing the same to reduce the necessary driving power of a mower. The rotary blade assembly includes a support structure fixedly disposed to a rotary drive shaft, at a height sufficient to avoid or to minimize contact with vegetation, such that the rotary drive shaft rotates the support structure about an axis. The rotary blade assembly includes a plurality of cutting elements that project downwardly and outwardly from the support structure to a predetermined distance such that the cutting elements are positioned to avoid contact with the ground and to cover the area to be cut in a more uniform way. The support structure of the rotary blade assembly can be a support arm having the cutting elements spaced over a length thereof. Alternatively, the rotary blade can be formed using a plate-shaped member having projecting portions extending downwardly for use as cutting elements. The projecting portions can be integral with the plate-shaped member or separately attached thereto. In other embodiments, a plurality of rotary blades are used in place of a single large conventional blade spanning the same width, whereby power requirements are reduced and a more uniform cut results. A blunt extension can be secured to or integral with the lower end of the drive shaft to prevent the cutting elements of the mower blade from contacting and disturbing the ground surface in uneven terrain.

31 Claims, 24 Drawing Sheets

U.S. PATENT DOCUMENTS

| | | |
|---|---|---|
| 3,073,101 | 1/1963 | Beaman et al. . |
| 3,093,952 | 6/1963 | Bonser .................................... 56/295 |
| 3,184,907 | 5/1965 | Harloff . |
| 3,243,944 | 4/1966 | Michaud . |
| 3,321,026 | 5/1967 | Hubbard . |
| 3,408,801 | 11/1968 | Kroll . |
| 3,621,642 | 11/1971 | Leake, Jr, . |
| 3,724,182 | 4/1973 | Long et al. . |
| 3,910,017 | 10/1975 | Thorud et al. ......................... 56/295 |
| 3,971,196 | 7/1976 | Stevenson . |
| 3,998,037 | 12/1976 | Deans et al. .......................... 56/295 |
| 4,031,696 | 6/1977 | Fleigle . |
| 4,064,680 | 12/1977 | Fleigle . |
| 4,160,356 | 7/1979 | Mathews ............................... 56/192 |
| 4,229,933 | 10/1980 | Bernard . |
| 4,232,505 | 11/1980 | Walto . |
| 4,245,456 | 1/1981 | Zipfel . |
| 4,262,476 | 4/1981 | Benenati ............................... 56/295 |
| 4,292,789 | 10/1981 | Mathews . |
| 4,292,791 | 10/1981 | Lalonde . |
| 4,297,831 | 11/1981 | Pioch .................................... 56/295 |
| 4,306,407 | 12/1981 | Dambroth . |
| 4,322,938 | 4/1982 | Efflandt . |
| 4,351,144 | 9/1982 | Benenati . |
| 4,420,925 | 12/1983 | Webster . |
| 4,429,518 | 2/1984 | Fedeli .................................... 56/295 |
| 4,578,938 | 4/1986 | Genesco ................................ 56/295 |
| 4,631,455 | 12/1986 | Taishoff . |
| 4,631,910 | 12/1986 | Doyen et al. . |
| 4,711,074 | 12/1987 | Jetzinger ............................... 56/13.6 |
| 4,711,077 | 12/1987 | Kutsukake et al. . |
| 4,715,173 | 12/1987 | Anderson . |
| 4,736,576 | 4/1988 | Mallaney et al. . |
| 4,779,407 | 10/1988 | Pattee . |
| 4,817,372 | 4/1989 | Toda et al. ............................ 56/12.8 |
| 4,862,682 | 9/1989 | Wait et al. ............................ 56/255 |
| 5,012,632 | 5/1991 | Kuhn . |
| 5,033,259 | 7/1991 | Adcock ................................. 56/295 |
| 5,123,236 | 6/1992 | Bablitz . |
| 5,167,109 | 12/1992 | Meinerding . |
| 5,197,268 | 3/1993 | Barrera ................................. 56/255 |
| 5,210,998 | 5/1993 | Hojo et al. . |
| 5,233,820 | 8/1993 | Willsie . |
| 5,274,987 | 1/1994 | Wiener . |
| 5,291,725 | 3/1994 | Meinerding . |
| 5,311,727 | 5/1994 | Fassauer . |
| 5,325,657 | 7/1994 | Bevis . |
| 5,375,400 | 12/1994 | Darden . |
| 5,402,629 | 4/1995 | Masaru . |
| 5,444,968 | 8/1995 | Barton . |
| 5,467,586 | 11/1995 | Lin et al. . |
| 5,515,670 | 5/1996 | Meinerding ........................... 56/295 |
| 5,561,972 | 10/1996 | Rolfe .................................... 56/295 |
| 5,600,943 | 2/1997 | Ryan .................................... 56/6 X |
| 5,642,609 | 7/1997 | Morrison .............................. 56/255 |
| 5,761,892 | 6/1998 | Quiroga ................................ 56/17.5 |
| 5,791,132 | 8/1998 | Wiedenmann ....................... 56/320.1 |

$v_R$   $v_t$

CUTTING PATH WIDTH

CUTTING PATH WIDTH

ROTARY MOWER APPARATUS

RELATED APPLICATIONS

This application is a continuation-in-part of the Applicant's U.S. patent application Ser. No. 08/607,158, filed on Feb. 26, 1996, which issued as U.S. Pat. No. 5,761,892 on Jun. 9, 1998.

BACKGROUND OF THE INVENTION

1. Field of the Invention

This invention relates to improved rotary mowers for cutting vegetation, such as grass lawns. More particularly, this invention relates to rotary blade assemblies for rotary mowers that provide an equivalent cut with a substantial reduction in necessary driving power, and modular or gang arrangements of rotary blade assemblies that reduce the necessary driving power of rotary mowers.

2. Description of the Related Art

Many conventional rotary mowers utilize a cutting blade that rotates in a substantially horizontal plane. Commonly, the blade is shaped symmetrically with substantially planar bottom surfaces. Outer portions of the blade are sharpened to provide an edge for cutting grass or other vegetation. An example of such a conventional blade is shown in FIG. 9A. The blade is attached to a drive shaft that rotates. As the mower is moved across a lawn or similar area, the rotating, sharpened edges of the cutting blade cut the vegetation to a width defined by the length of the blade, independently of the length of the sharpened outer end portions.

Most such rotary mowers utilize a motor to provide rotational driving power to the blade. In order to obtain a clean cut, the blade is driven at a relatively high rate of rotation. While varying with the particular dimensions of the cutting blades, a typical manually propelled rotary mower with a twenty-inch cut utilizes an internal combustion motor of 3 to 4 horsepower to provide the driving power required to maintain a high rotational velocity. Most new push mowers and mulchers have increased the size of the driving motors to 5 and even 6 horsepower.

Various adaptations and modifications to this basic design have been proposed. In particular, there have been many prior art attempts to address the problems associated with dulling of the sharpened edges of the cutting member. For example, U.S. Pat. No. 4,779,407 to Pattee describes a rotary member that employs relatively inexpensive, disposable cutting components intended to be frequently replaced. U.S. Pat. No. 5,467,586 to Lin et al. similarly proposes the use of detachably affixed cutting blades. U.S. Pat. No. 4,715,173 to Anderson describes an accessory bar to which are attached various components for cutting, mulching and raking a lawn. Other prior art devices, such as described in U.S. Pat. No. 4,229,933 to Bernard, similarly address the problem of dulling by simplifying the task of removing and reattaching the blade for sharpening.

Many other prior art rotary mowers have been proposed to perform additional tasks beyond the cutting function provided by horizontally disposed cutting surfaces. For example, U.S. Pat. No. 2,720,071 to Watanabe describes a rotary blade having sharpened protrusions that extend into turf to uproot and cut low growing runners. U.S. Pat. No. 2,942,397 to Clark refers to tiller projections that extend downwardly to "power renovate" or "power rake" the soil. U.S. Pat. No. 3,321,026 to Hubbard, U.S. Pat. No. 3,724,182 to Long et al. and U.S. Pat. No. 4,306,407 to Dambroth each similarly utilize downwardly directed times or projections to rake or scarify the soil.

A variety of structures have also been proposed to provide a "mulching" of cut grass. Such devices include U.S. Pat. Nos. 5,167,109 and 5,291,725 to Meinerding that describe additional cutting edges attached to a horizontal blade to finely shred vegetation. U.S. Pat. No. 5,375,400 describes a plurality of triangular-shaped cutting blades extending perpendicularly to a square mounting section to mulch a high volume of cut vegetation. Additionally, the above-noted patent to Anderson describes an accessory to mulch previously cut vegetation.

While improving upon particular aspects of the basic horizontal cutting blade used in rotary mowers, the above-mentioned prior art devices generally share a relatively high power requirement to ensure proper cutting and to perform such additional tasks as mulching, shredding or raking a lawn. This power requirement results from a number of different factors. First, several surfaces of the conventional mower, including the cutting blade, comes into contact with the vegetation. This results in a relatively large amount of friction causing considerable power requirements to rotate the blade and to move the mower forward.

Moreover, due to the forward translation of the mower (Vt), there is both a longitudinal movement of the blade along with a rotational movement of the blade. Since only the outer portions of the conventional blade are sharpened, there is an irregular coverage of the area to be cut inside the cutting path. As seen in FIG. 9B, the outer parts of the cutting path will have many repetitive and overlapping passes in relation to the few necessary passes to cover the center portion of the cutting path.

In order to illustrate the irregular covering of the inside area of the cutting path better, the track of only one of the two outer sharpened edges of the conventional mower blade of FIG. 9A is shown in FIG. 9B. The sharpened edge of the opposite end will have a mirror image path of the shown path (displaced by the length of advance of the mower corresponding to one-half turn), which fills most of the blanks seen in FIG. 9B and further repeats the tracks of the outer ends of the cutting path.

Even after an area of vegetation has been cut by the blade, friction is applied to the blade each time it subsequently scales a previously cut area, causing a further dissipation of energy. Since the cutting blade is substantially horizontal, a relatively large area of the blade rubs against the vegetation. The excess power required because of this effect is proportional to the number of times the blade subsequently scales this previously cut portion, and is also proportional to the radial distance from the center to the cutting edges (i.e., there is a higher torque at the outer ends). Since conventional mowers have blades rotating at large angular velocities in order to ensure a proper cut, the power demand becomes even more pronounced.

Existing mulching mowers work on the basis of repetitive cutting of the clippings while the clippings are in the air (on the fly). According to an Ohio State University Extension Fact Sheet, this is typically facilitated by using "high lift blades with expanded cutting edges and restrictions in the discharge ports" of the mower. These conventional mulching mowers demand extra power and require relatively high tangential speeds and well-sharpened cutters, besides special deck construction, to direct and confine the clippings under the action of the rotating cutters. Further, the rotating cutters of the conventional mulching mowers typically include a plurality of cutters protruding above a horizontal blade.

The increased power requirement associated with prior art mowers results in several drawbacks. For example, it is generally necessary to utilize a relatively large internal combustion motor to obtain a desired level of cutting, mulching, raking, and so forth. The size and weight of such a power source further reduce the handling and ease of use of the mower, and contribute to greater expense in manufacturing, sales (e.g., because of increased storage demand and difficulty in transport), and day-to-day use. In addition to the expense resulting from increased energy consumption, larger internal combustion motors are also characterized by increased exhaust emissions that detrimentally affect the quality of the environment.

In addition, rotary mowers having downwardly protruding cutters according to the present invention (described below) may have certain drawbacks when used to cut grass in uneven terrain. For example, when a rotary mower having a mower blade with downwardly protruding cutters rotating in a horizontal plane traverses a ridge or other surface undulation, the mower blade tends to cut the grass too close to the soil or even gouge into the soil itself. This is because the wheels of a conventional mower, which are positioned outside the rotating path of the blade, provide the only means for regulating the height of cut provided by the mower. Thus, the irregularities in terrain between the wheels of the mower are not taken into account by the mower in determining what height to maintain the cutting blade.

SUMMARY OF THE INVENTION

The present inventor has recognized that as a conventional mower is moved across an area, a substantial portion of the vegetation to be cut, particularly the low growing vegetation, is not typically disposed perpendicularly with respect to the ground as it encounters the cutting blade of the mower. Rather, various strands of this vegetation are bent over or matted down. As a result, a substantial volume of the vegetation is not located at an ideal position with respect to the cutting member in conventional mowers (that is, in a position perpendicular to the cutting edge of the blade). Even if the vegetation is upraised naturally or by a suction effect created by the rotational movement of the horizontal cutting blade, a substantial amount of the vegetation contacts portions of the blade. As described earlier, since the vegetation comes into contact with the bottom surface of the conventional mower, substantial friction results. Friction also results from the substantially horizontal position of the blade as it rotates at high speeds in contact with the underlying vegetation. This produces a drag against both the rotational movement of the cutting blades and the forward movement of the mower that, in turn, causes increased power demand. These effects are shown in FIGS. 10A and 10B where a matted grass is being dragged by the blade instead of being cut by it.

Moreover, with the conventional blade shown in FIGS. 10A and 10B, the applied torque is larger than necessary when the center area of the cutting path (i.e., the front and rear areas of the circles formed by the rotating blades) is cut with outer end cutters of relatively large blades (for example, blades having a cutting diameter of about 20 inches or larger). This increased torque requirement results in a further increased power demand for the mower. In addition, conventional mower blades, as shown in FIGS. 10A and 10B, provide poor mulching of grass clippings, unless the blades are rotated at relatively high tangential speeds, have well-sharpened cutting surfaces, and are used with a special deck construction to confine the clippings.

In view of these drawbacks and limitations, a principal object of the present invention is to provide a rotary mower that obtains an equivalent cut in comparison with conventional mowers but with a substantial reduction in power requirements and energy consumption. This object is achieved by reducing the area of the blade that comes into contact with the vegetation and also reducing the resistance to the cut itself by properly locating the relatively few and short sharpened edges of the cutting elements. This significantly reduces the friction applied to the blade by such vegetation, as seen in FIG. 5A. Moreover, the power is reduced by providing sharpened cutting elements at other sections of the blade in addition to the outer portion or, alternatively, by using multiple smaller rotary blades instead of one larger blade. This allows for a thorough cut of the area of vegetation under the span area of the blade substantially reducing the larger torque and the repetitious scaling of previously cut areas, as mentioned above in the discussion of the conventional mowers.

A related object is to provide a method of adapting preexisting mower designs to maintain an equivalent cut as a conventional mower, but with a substantial decrease in the power supply requirement.

A further object of the present invention is to provide a mower assembly having multiple cutting blades arranged to provide an even coverage over the cutting path width to achieve a better cutting and mulching efficiency with a reduction in power requirements and energy consumption.

A still further object of the present invention is to provide a blunt extension for attaching to a drive shaft on which the mower blade is mounted to prevent the downwardly protruding cutting elements of the mower blade from cutting too close or contacting the ground when traversing uneven terrain.

Directed toward achieving these objects and others, described is a blade assembly for a rotary mower comprising a rotating support structure having means for affixing to a rotary drive shaft at a height sufficient to substantially avoid contact of the support structure with vegetation to be cut by the blade assembly, the support structure being rotatable about an axis, and a plurality of cutting elements projecting downwardly from the support structure and radially outwardly relative to the axis of the support structure. The cutting elements each extend from the support structure a distance such that the cutting elements are positioned at a sufficient height to avoid contact with the ground. The cutting elements each have a sharpened leading edge for cutting and shredding vegetation.

According to one aspect of the invention, the sharpened leading edges of the cutting elements provide the only sharpened surfaces of the rotary mower for cutting vegetation, and the sharpened surface of each cutting element is disposed at an acute angle relative to a transverse axis of the support structure.

According to one embodiment of the invention, the sharpened surface defines a straight edge.

According to another embodiment of the invention, the sharpened surface defines a curved edge.

According to another aspect of the invention, the acute angle of the sharpened leading edges of the cutting elements relative to the axis of rotation of the drive shaft is between 20° and 60°, and preferably about 45°.

According to yet other aspects of the invention, the cutting elements are arranged either symmetrically or asymmetrically along the support structure at varying radial distances from the axis of rotation of the support structure. If the cutting elements are arranged asymmetrically, counterweight means are provided on the support structure to balance the support structure during rotation.

According to another embodiment of the present invention, the support structure comprises a thin plate member having a plurality of projections that extend downwardly and radially outwardly relative to the axis of rotation to form the cutting elements. A number of variations in the shape of the thin plate member and the number of projections forming the cutting elements are disclosed.

According to still another aspect of the invention, a matting means, formed by bending the front end of the frame in a curved shape, is provided for bending relatively tall vegetation as the mower is moved forward, thus reducing drag applied to the front of the mower, whereby a portion of the vegetation is positioned substantially perpendicularly to the cutting elements as the cutting elements rotate about the drive shaft.

Also described herein is a rotary mower having reduced power requirements and energy consumption, comprising a frame supported by a plurality of wheels, a drive shaft having a longitudinal axis disposed substantially perpendicularly with respect to an area of vegetation to be mowed, the drive shaft being rotatably driven by a power supply, and a first blade assembly comprising a support structure and a plurality of cutting elements. The support structure is fixedly connected to the drive shaft at a height sufficient to substantially avoid contact of the support structure with vegetation to be cut by the mower, the drive shaft rotating the support structure about the longitudinal axis of the drive shaft. The plurality of cutting elements project downwardly from the support structure and radially outwardly relative to the axis, each cutting element extending from the support structure a distance such that the cutting elements are positioned at a sufficient height to avoid contact with the ground. The cutting elements each have a sharpened leading edge for cutting vegetation, whereby vegetation is cut as the blade rotates and moves forward across the area of vegetation.

According to another aspect of the invention, a plurality of smaller blade assemblies are provided over a cutting width of the mower to provide a more even and regular coverage of the cutting elements across the cutting path width. The multiple blade assemblies can be positioned, for example, in a staggered manner, a V-shaped configuration, or in two or more rows across the cutting width of the mower. The multiple blade assemblies can also be positioned at different heights in each row. In exemplary embodiments, four or more blade assemblies according to the present invention are provided for large mowers above 22 inches wide, while three or even two blade assemblies are provided for small mowers of 22 inches wide or less.

According to another aspect of the present invention, a blunt extension connected to a lower end of the drive shaft is provided, the blunt extension having a lowermost portion positioned at approximately the same height as a lower cutting tip of the cutting elements. A lower surface of the blunt extension facing the ground preferably has a generally convex shape to minimize damage and disturbance of the ground being mowed. A number of variations in the shape and configuration of the blunt extension are described herein.

Also described herein is a method of reducing rotational and translational drag in a rotary mower, comprising the steps of removing a first substantially planar cutting blade formerly attached to a rotary drive shaft of the mower, and replacing the first cutting blade with a second improved blade assembly. The second blade assembly includes a support structure fixedly attached to the rotary drive shaft at a height sufficient to avoid, or at least reduce, contact with vegetation to be cut by the second blade, the rotary drive shaft rotating the support structure about an axis, and a plurality of cutting elements projecting downwardly from the support structure and radially outwardly relative to the axis, each cutting element extending from the support structure to a distance such that the cutting elements are positioned at a sufficient height to avoid contact with the ground (sometimes a small increase in wheel diameter may be needed), the cutting elements each having a sharpened leading edge for cutting and shredding vegetation, whereby vegetation is cut as the blade rotates and moves forward across an area of vegetation.

According to a further aspect of the invention, this method further includes a step of replacing an original power source, such as an internal combustion motor, that rotates the rotary drive shaft with a substitute power source that operates at a substantially reduced power level, such as a smaller internal combustion motor or an electric motor, to drive the second blade assembly, which has a smaller rotational drag than the first blade. This aspect of the present invention is particularly advantageous for use with cordless, rechargeable, battery-powered electric motors.

According to other aspects of the present invention, the method further includes: the step of replacing the first blade assembly with a second blade assembly comprising a plate member having a plurality of projections that are bent downwardly and radially outwardly relative to the axis of rotation to form the cutting elements; the step of replacing the first blade with a plurality of blade assemblies positioned across a cutting width of the mower; or the step of connecting a blunt extension to a lower end of the drive shaft, the blunt extension having a lowermost portion positioned at approximately the same height as a lower cutting tip of the cutting elements of the second blade assembly.

Other objects and features of the invention will become apparent from the following description of preferred embodiments of the present invention.

BRIEF DESCRIPTION OF THE DRAWINGS

The invention and its advantages will be more fully described by way of example in the following description of the invention as illustrated in the accompanying drawings. In the drawings.

DETAILED DESCRIPTION OF THE PREFERRED EMBODIMENTS

The preferred embodiments of the present invention will now be described in detail by making reference to FIGS. 1 to 37 of the drawings.

Figure 1:
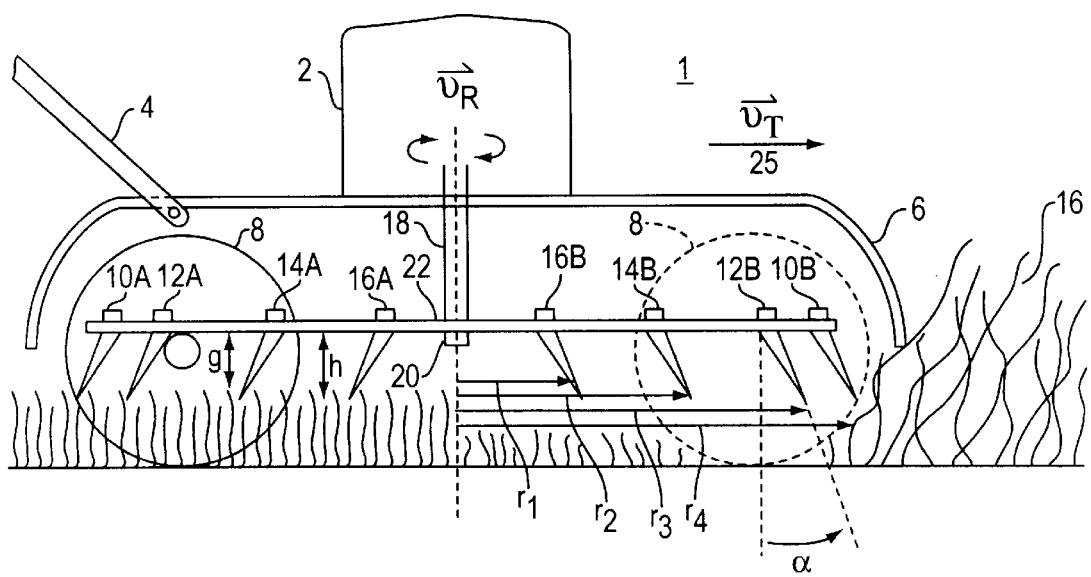
FIG. 1 is side view of a rotary mower utilizing a rotating blade in accordance with an embodiment of the present invention.
Figure 2:
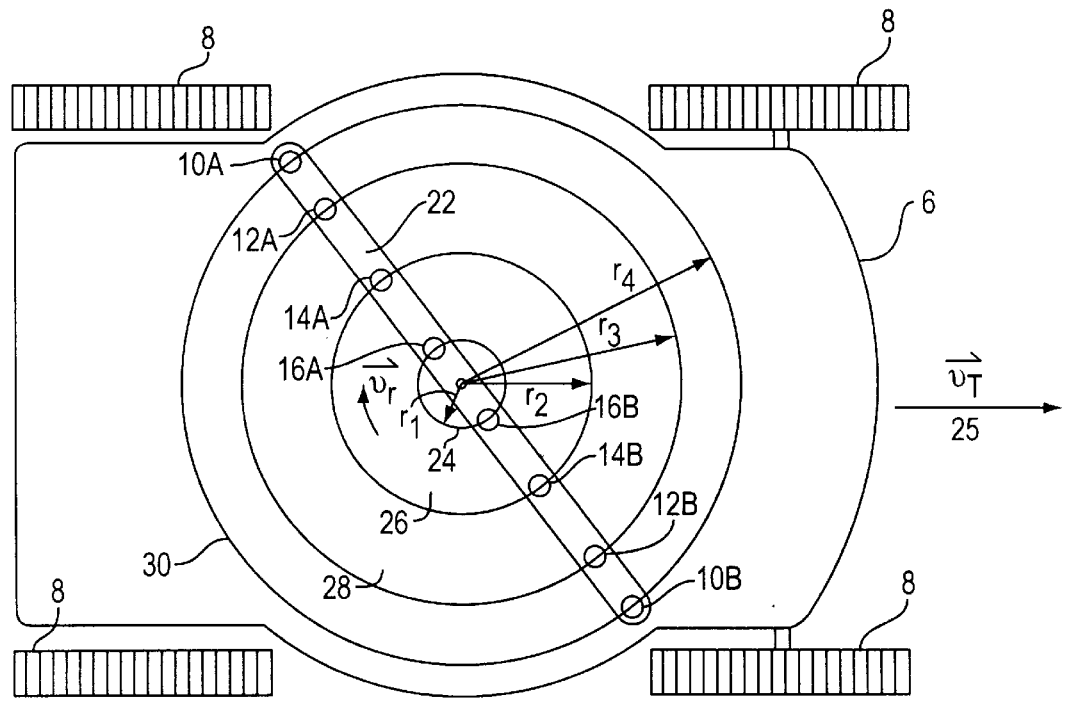
FIG. 2 is a top plan view of the rotary mower shown in FIG. 1.

FIGS. 1 and 2 illustrate a manually propelled rotary mower 1 according to an embodiment of the present invention. While many features common to conventional rotary mowers are omitted for convenience, it will be appreciated by those skilled in the art that the example shown may be readily adapted to include such conventional features. It will also be understood that the features described below are equally applicable to self-propelled and pull-type mowers.

The rotary mower 1 shown in FIGS. 1 and 2 includes a handle 4 attached to a rear portion of a frame 6. The frame 6 is supported by four wheels 8. By pushing the handle 4, the rotary mower 1 can be moved with a translation velocity $V_T$ in a forward direction 25. A motor 2, for example, an internal combustion motor or an electric motor, disposed on a top surface of the frame 6 rotates a drive shaft 18 with a rotational velocity $V_R$.

A rotary support arm 22 is affixed to the drive shaft 18 with a conventional fastener 20. The longitudinal axis of the support arm 22 is disposed in a horizontal plane that lies parallel to the ground over which the mower is pushed. The rotary support arm 22 is set at a height that is higher than the vegetation that has been cut in order to avoid contact between the support arm 22 and such vegetation. This arrangement, which can best be seen by the exploded view of FIG. 5A, results in reduced drag applied to the mower blade by the vegetation. The support arm 22 according to the invention includes four pairs of cutting elements 10A, 10B, 12A, 12B, 14A, 14B, 16A and 16B fixedly attached along the support arm 22 in a downward or near vertical direction. Any conventional fastener, such as a threaded bolt, can be utilized to affix the cutting elements to the support arm 22.

The cutting elements shown in this example include a first pair 10A and 10B disposed at a radial distance $r_4$, as measured from the axis of rotation of the support arm 22. A second pair of cutting elements 12A and 12B are disposed at a radial distance $r_3$, a third pair of cutting elements 14A and 14B are located at a radial distance $r_2$, while a fourth pair of cutting elements 16A and 16B are located at a radial distance $r_1$. Thus, while the rotary mower 1 is stationary, the first pair of cutting elements 10A and 10B rotate along a first circular path 30, as shown in FIG. 2; the second pair of cutting elements 12A and 12B rotate along a second circular path 28; the third pair of cutting elements 14A and 14B rotate along a third circular path 26; and the fourth pair of cutting elements 16A and 16B rotate along a fourth circular path 24.

As shown in FIGS. 1 and 2, the cutting elements 10A, 10B, 12A, 12B, 14A, 14B, 16A and 16B are not spaced evenly along the support arm 22. Instead, the cutting elements 10A and 12A located farthest from the axis of rotation are positioned closer to each other at the outer end portion of the support arm 22 than are the cutting elements 14A and 16A located closest to the axis of rotation at the inner portion of the support arm 22. This arrangement of the cutting elements provides a more efficient cutting of grass by placing at least two cutting elements 10A, 12A and 10B, 12B near the outer end portions of the support arm 22 where the cutting elements will travel at a higher speed than cutting elements placed near the inner portion of the support arm 22. The cutting elements are preferably positioned along the support arm 22 such that the following relationships exist:

$r_4 - r_3 < r_3 - r_2$ $r_4 - r_3 < r_2 - r_1$ $r_4 - r_3 < r_1$

As explained in greater detail herein, different arrangements of cutting elements may be advantageously used in accordance with the invention. In the example shown in FIGS. 1 and 2, the cutting elements 10A, 10B, 12A, 12B, 14A, 14B, 16A and 16B are arranged symmetrically in order to obtain dynamic balance as the support arm 22 rotates. However, certain advantages may be obtained by using a plurality of asymmetrically arranged cutting elements with corresponding balancing counterweights, as shown by reference numeral 57 in FIGS. 6A and 6B. Moreover, while adjacent cutting elements shown in FIGS. 1 and 2 are spaced at uneven distances from each other, the cutting elements according to the invention can also be evenly spaced over the length of the support arm 22.

As shown in FIG. 1, the longitudinal axis of each cutting element is fixedly oriented in a near vertical downward direction toward the ground. In the example shown, each cutting element is inclined outwardly at an angle $\alpha$ with respect to the vertical axis of rotation (which is concentric with the longitudinal axis of the drive shaft 18). This angle may be, for example, between 0° and 60°. However, as explained in greater detail below, it has been found that an angle $\alpha$ of between 20° and 60°, and preferably about 45°, significantly reduces drag while providing a suitable cut in comparison with a conventional rotary mower driven by a larger motor. This angle further facilitates outward propulsion of cut vegetation, thereby minimizing accumulation of such vegetation on the blade.

Figure 3:
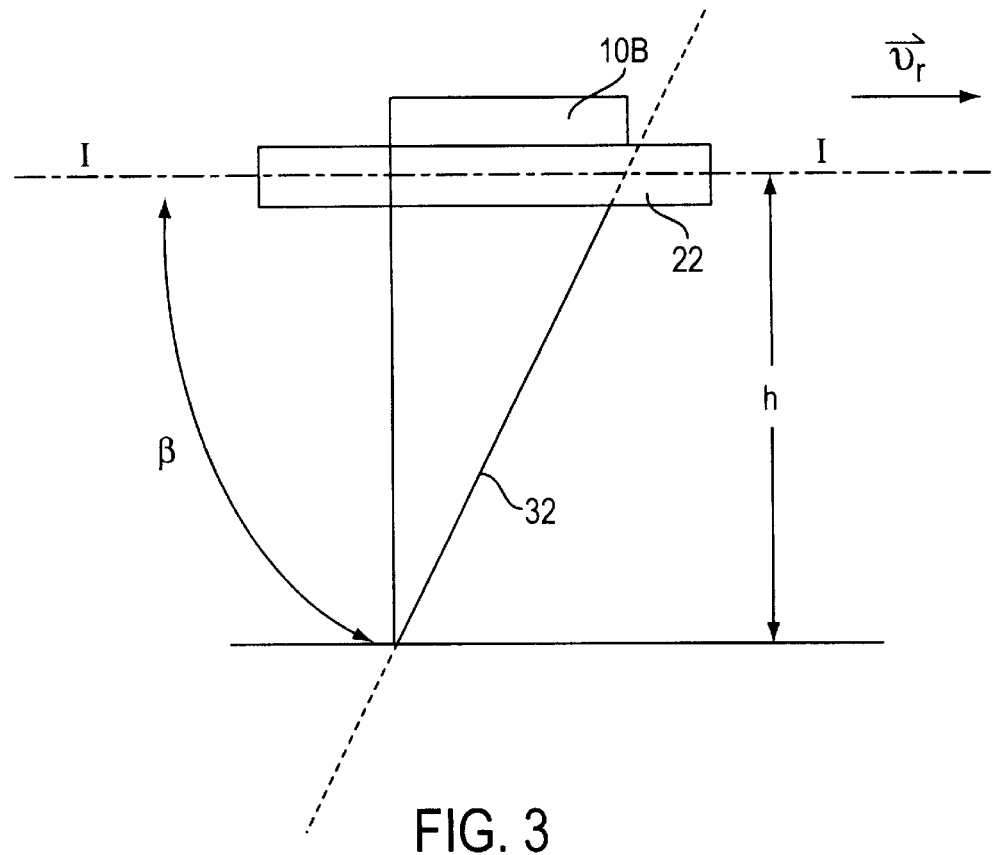
FIG. 3 is a front end view of a cutting element shown in FIG. 1.

FIG. 3 shows one of the cutting elements 10B according to a first embodiment of the above-described mower. This cutting element 10B has a cutting edge 32 inclined relative to the transverse axis of the rotary support arm 22, designated as axis I-I in FIG. 3. The cutting edge 32 is brought into contact with vegetation 16 as the mower is moved forward and as the support arm 22 moves about its axis of rotation. The cutting elements thereby cut the vegetation 16 down to a height h as measured from the position of the support arm 22.

Figure 4:
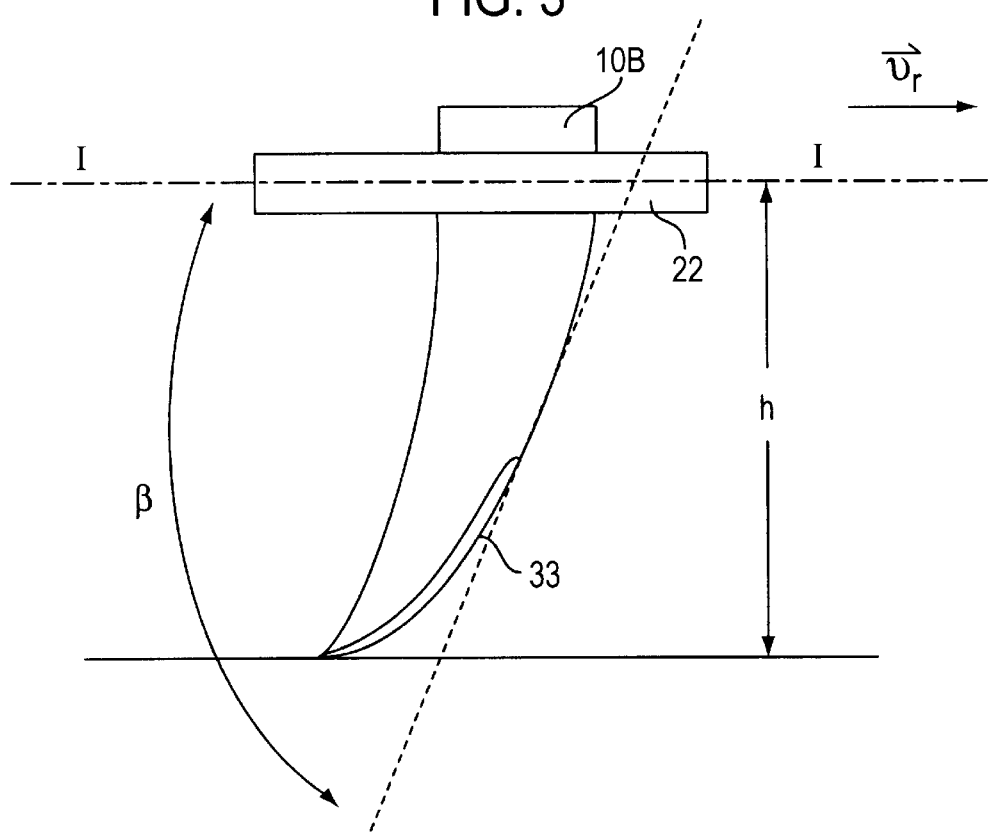
FIG. 4 is a front end view of a second embodiment of the cutting element of FIG. 1.

FIG. 4 shows a cutting element according to a second embodiment of the invention that has a curved-shaped, sharpened cutting edge 33.

As seen in FIGS. 3 and 4, an acute angle $\beta$ is formed between the transverse axis I-I of the support arm 22 and the cutting edge 33 of the cutting element 10B. This particular arrangement of the cutting element minimizes any accumulation of grass on the cutting surface (32 or 33) by facilitating a downward dropping of the grass, thus minimizing drag on the cutting element caused by such accumulation.

It has been discovered through the Applicant's theoretical research and experimentation that the rotary mower 1 according to the example shown in FIGS. 1 to 2 requires substantially less power to operate in comparison to a conventional rotary mower with a similar cutting diameter.

In contrast to a conventional blade having a substantially horizontal cutting surface, the downwardly disposed cutting elements of the present invention are ideally positioned to cut across the matted vegetation at a height h measured downwardly from the plane of the support arm 22 as seen in FIG. 1. This permits matted or bent vegetation to be cut where it might otherwise not be by a horizontally positioned blade (particularly where the vegetation is long). Moreover, the cutting elements of the present invention provide a reduced area that rubs or drags against the vegetation in comparison with horizontally disposed cutting surfaces.

As shown in FIG. 1, the support arm 22 is positioned at a height g above the tallest grass or vegetation that has been cut by the mower assembly 1. The lower tips of the cutting elements 10A, 10B, 12A, 12B, 14A, 14B, 16A and 16B are positioned a distance of h from the support arm 22, as mentioned above. The distances g and h shown in FIG. 1 are slightly different because the lower tips of the cutting elements do not engage and cut each piece of vegetation. Rather, the vegetation is cut at slightly varying heights depending on which portion of the sharpened edges of the cutting elements engages and cuts the vegetation. Although the cutting tips cut the grass or vegetation at slightly varying heights, the overall appearance of the cut grass or vegetation from the mower blade of the present invention is quite similar to that provided by conventional mower blades.

Figure 5:
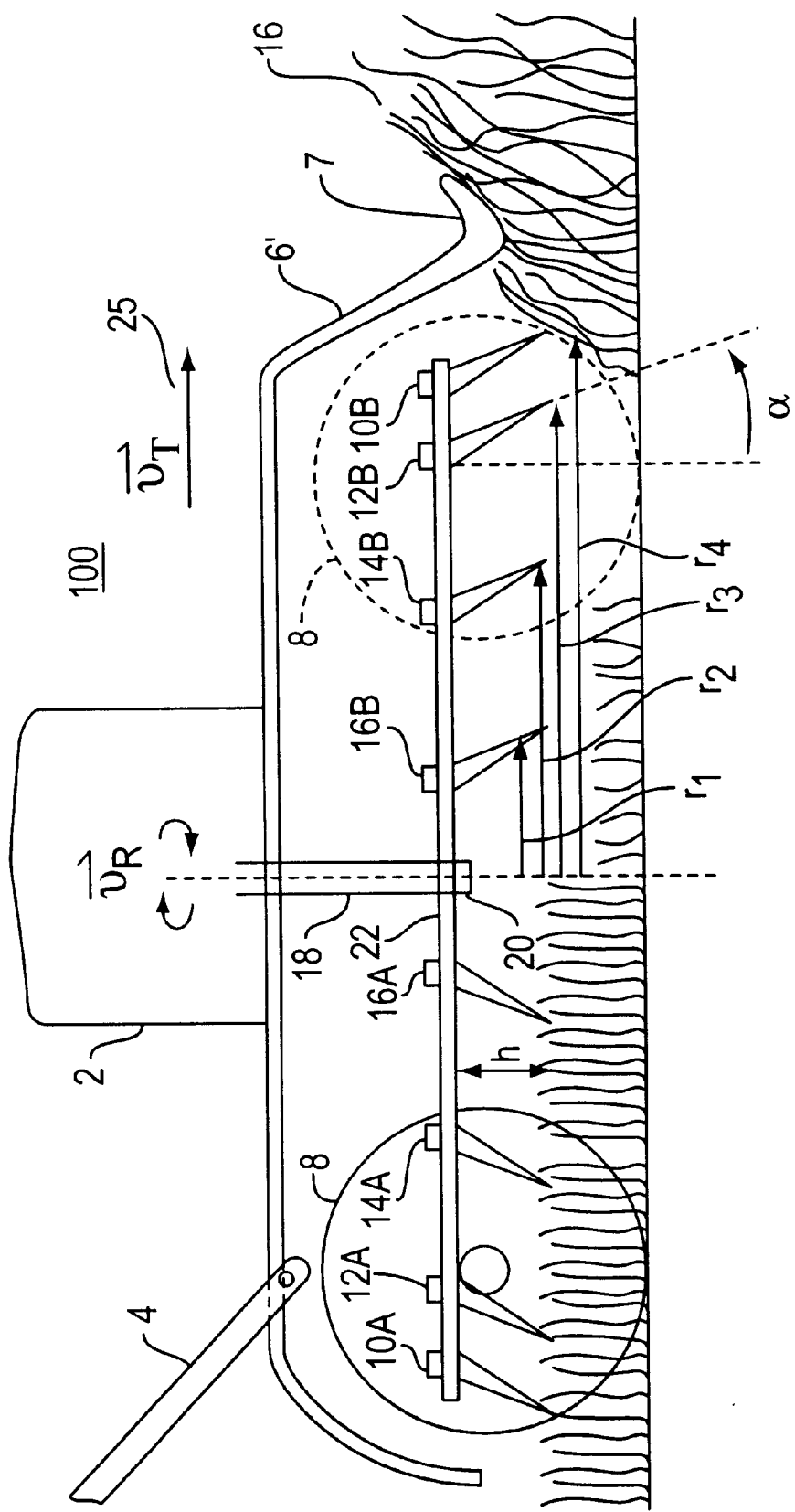
FIG. 5 is side view of a rotary mower having a frame that includes a matting means in accordance with the present invention.
Figure 5A:
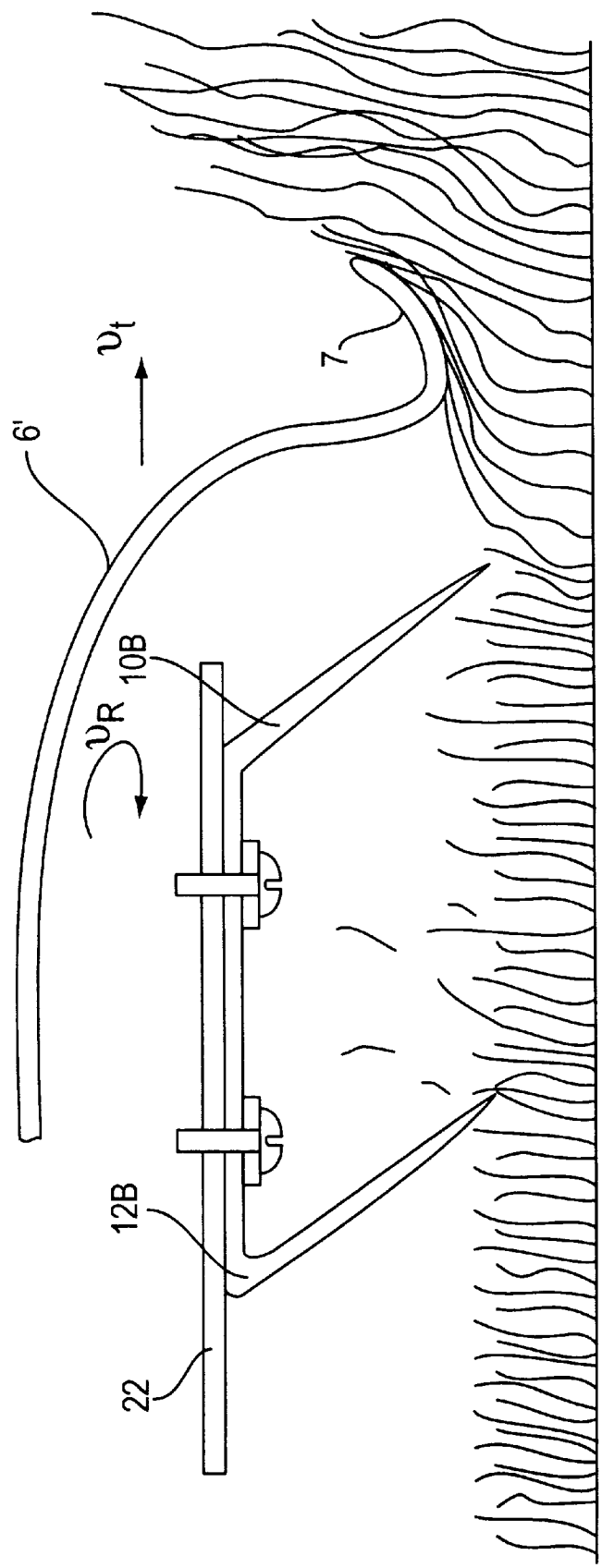
FIG. 5A is an enlarged side view of a section of FIG. 5 showing vegetation coming into contact with a cutting element of the blade of the rotary mower of FIG. 5.

Since the support arm is positioned at a height g above the top of the vegetation that has already been cut, there is a significant reduction of friction on the support arm caused by vegetation brushing against it (see FIGS. 1, 5 and 5A). As a result, a substantial reduction in overall drag is obtained. This in turn results in a significant reduction in the size and power of the motor 2 necessary to drive the support arm 22.

In contrast to prior art scarifying, renovating and raking devices, the cutting elements of the present invention are fixedly positioned above the ground at a height sufficient to cut the top portions of the vegetation uniformly while avoiding the roots or tendrils of the vegetation or the underlying soil. This avoids the resulting drag effect that is otherwise encountered.

FIG. 5 illustrates a rotary mower 100 according to the invention in which the frame 6' of the mower 100 has been modified in comparison to the foregoing example. Specifically, in this example, the frame 6' includes a matting means 7 for bending the vegetation 16 that is to be cut, particularly relatively high grass. In this example, an additional extension portion 7 of the frame 6' provides this matting function while also reducing drag. As a result of this modification, a greater portion of the vegetation to be cut is ideally positioned for a clean cut by the downwardly positioned cutting elements 10A, 10B, 12A, 12B, 14A, 14B, 16A and 16B.

FIG. 5A is an exploded view of a section of FIG. 5 showing vegetation coming into contact with cutting elements 10B and 12B of the blade of the rotary mower 100 of FIG. 5.

Figure 6A:
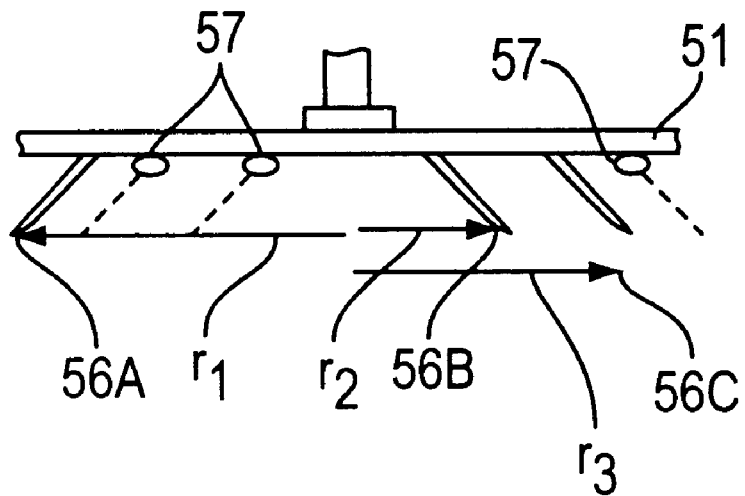
FIGS. 6A and 6B are respective side views of two blade assemblies according to alternative embodiments of the invention.
Figure 6B:
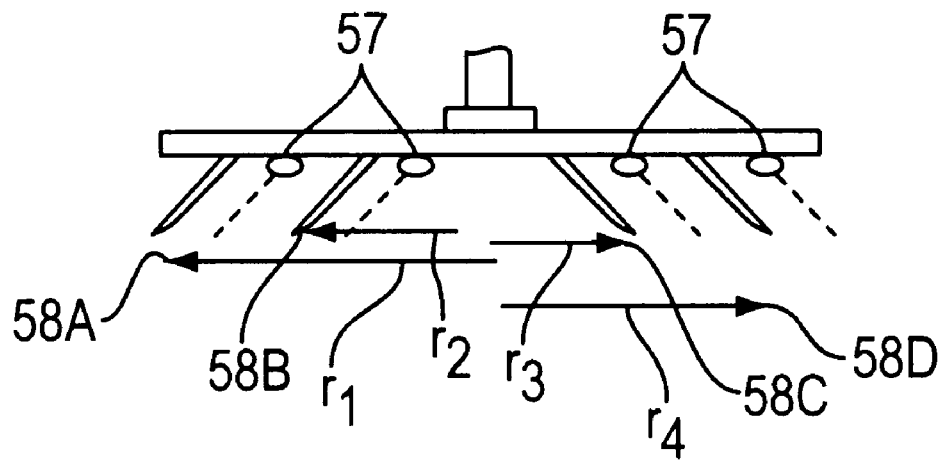

The present invention is not limited to the specific arrangements of cutting elements described in the foregoing examples. Rather, it has been discovered that alternate arrangements of cutting elements can be utilized to achieve satisfactory results. FIGS. 6A and 6B illustrate two examples of mower blades that may be used depending on the type of cut that is desired. As illustrated with these examples, a cleaner, more polished cut may be obtained where the cutting elements are arranged asymmetrically to avoid duplicative cutting. The quality of the cut may also be adjusted by varying the translational speed of the mower in relation to the rotational speed of the supporting arm.

FIG. 6A illustrates an example in which three cutting elements 56A, 56B and 56C are positioned asymmetrically along the support arm 51 at respective radial distances $r_1, r_2$ and $r_3$. In FIG. 6B, four cutting elements 58A, 58B, 58C, 58D are positioned at respective radial distances $r_1, r_2, r_3$, and $r_4$. A plurality of balancing counterweights 57 are fixed to the support arm 51 to balance the asymmetric placement of the cutting elements. Alternatively, the support arm 51 can be provided with openings or cutouts as a counterweight means for balancing the asymmetric placement of the cutting elements.

Figure 7B:
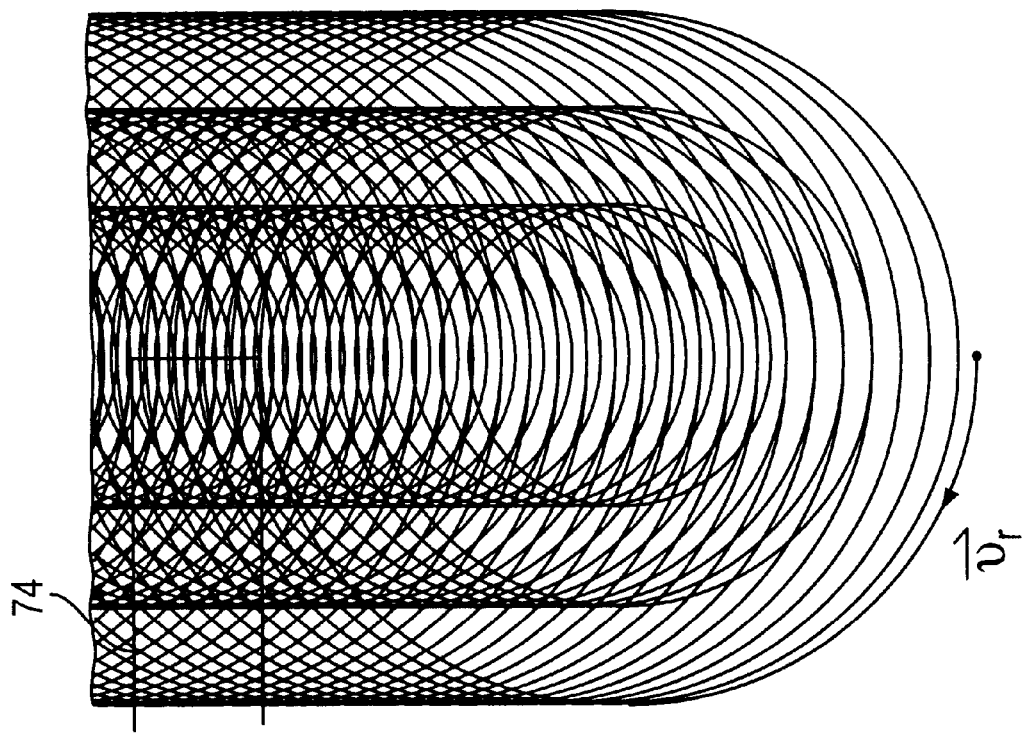
FIGS. 7A and 7B are comparative graphical illustrations of cutting paths obtained by lower tips of cutting elements of the present invention for one outer end cutter and for three cutters radially distributed on the support structure, respectively.
Figure 7A:
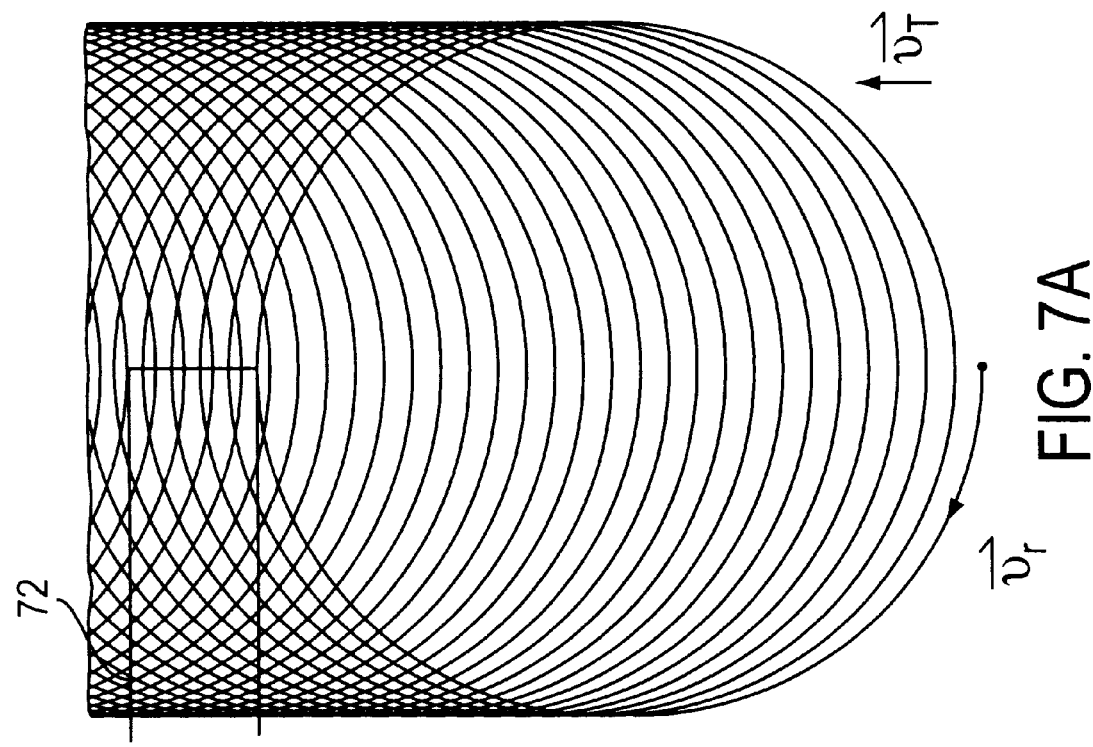

To aid in understanding a principle of the invention, FIGS. 7A and 7B are graphical representations of the respective paths of cutting elements as they are rotated at a rotational speed $V_R$ corresponding to approximately 3000 rpm and a translational speed $V_T$ of approximately one m/s. In each example, a cutting element is provided at a distal end of the supporting arm 51 that results in a cut having a width of twenty inches.

In the cutting element arrangement resulting in the graphical representation of FIG. 7A, only one cutting element is on the support arm. The radial distance $r_1$ of the cutting element from the axis of rotation of the support arm is approximately ten inches resulting in a cutting width of twenty inches. In the cutting element arrangement resulting in the graphical representation of FIG. 7B, three cutting elements are arranged asymmetrically at radial distances $r_1$ to $r_3$, which range from 3.5 inches to ten inches.

Figure 8A:
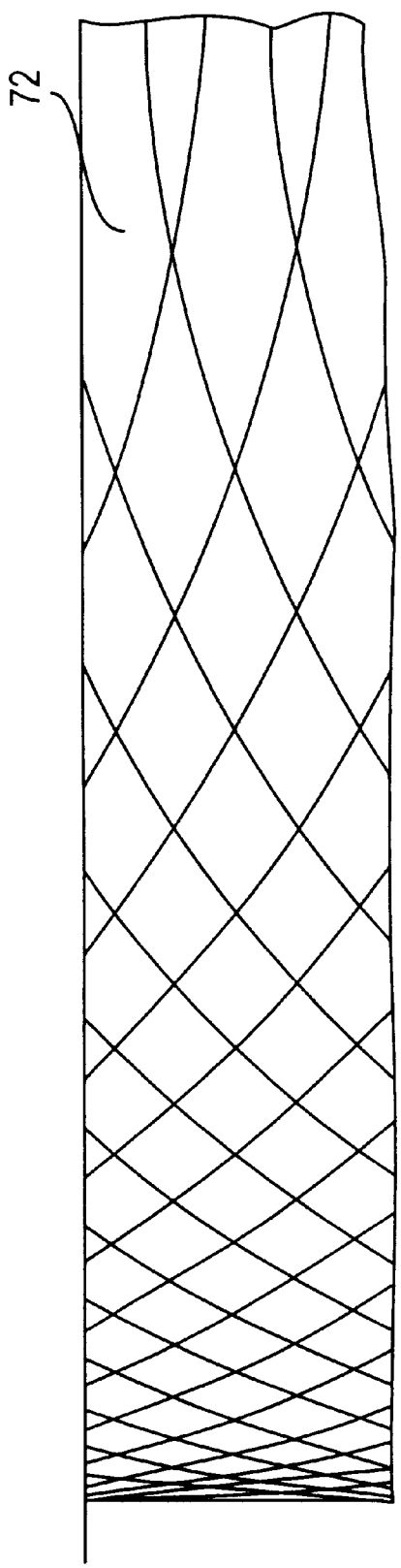
FIGS. 8A and 8B are more detailed views of respective portions of the graphical illustrations of FIGS. 7A and 7B.
Figure 8B:
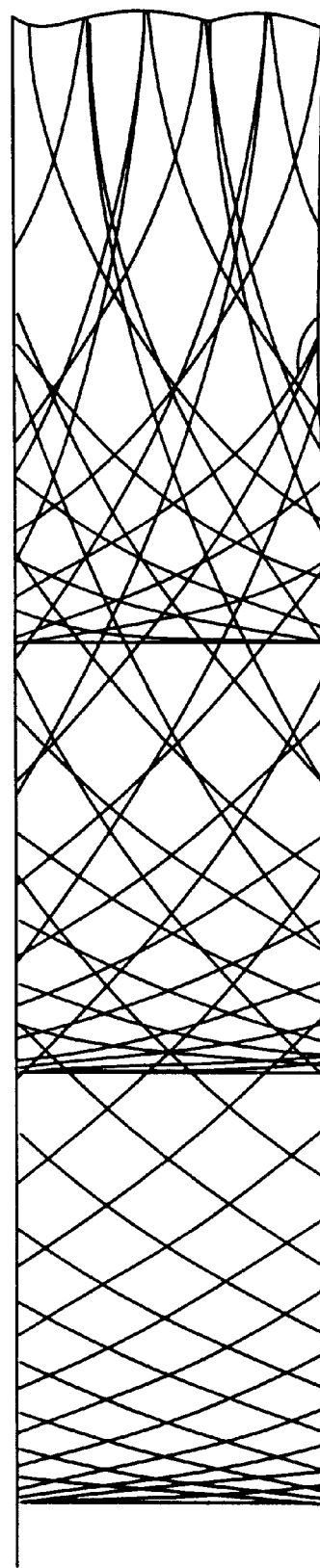
Figures 9A, 9B:
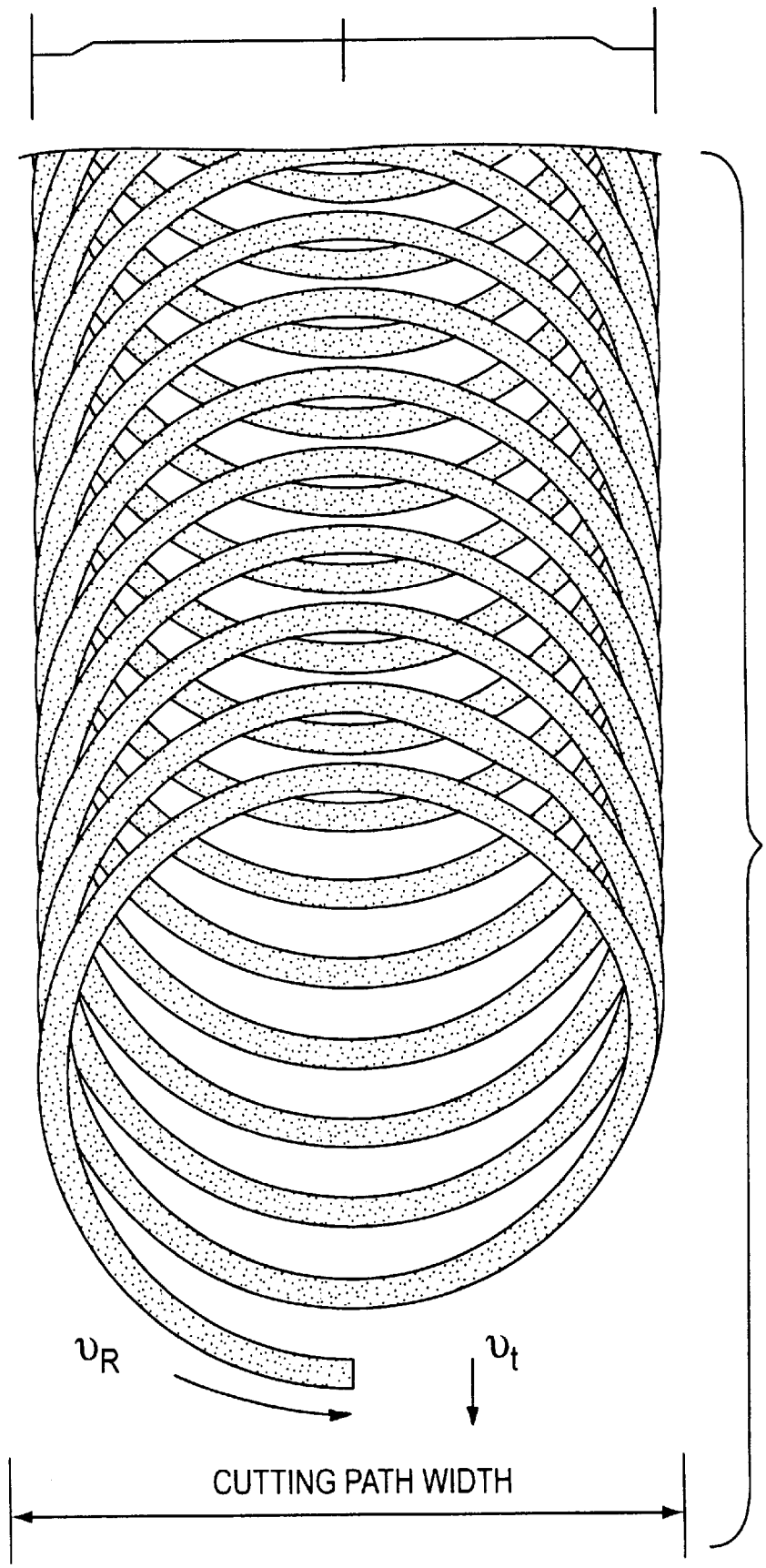
FIG. 9A is a side view of a conventional cutting blade used in rotary mowers.
FIG. 9B is a graphical illustration of a cutting path obtained by one of the two outer sharpened edges of the conventional cutting blade of FIG. 9A.
Figure 10A:
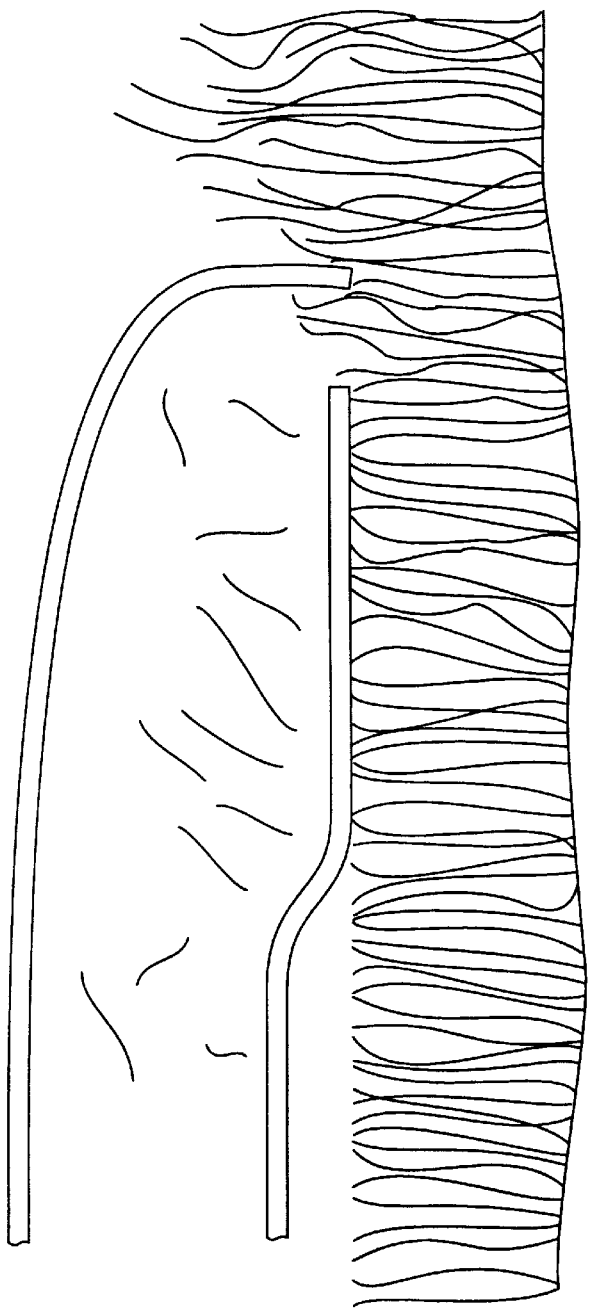
FIGS. 10A and 10B are views of vegetation coming into contact with a conventional rotary mower.
Figure 10B:
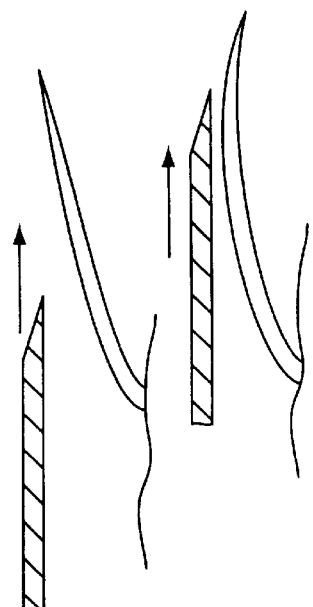

As made apparent from the graphical illustrations of FIGS. 7A and 7B, and the respective enlarged portions 72 and 74 of these figures as set forth in FIGS. 8A and 8B, it can be appreciated that a greater portion within the area to be cut is covered by the inclusion of additional cutting members, as indicated by the increased number of lines in FIG. 8B as compared with FIG. 8A. The precise number of cutting elements to be used depends on the type of vegetation to be cut, and the quality of the cut desired.

It has been found that the amount of power required by the rotary mower is not increased substantially by providing additional sharpened cutting elements at other sections of the support arm in addition to the outer portion. This is because the inner cutting elements are performing work that would otherwise need to be done by the outer cutting element that has a larger rotational distance from the rotary shaft and, thus, a larger torque than the inner cutting elements.

Furthermore, by providing the inner cutting elements, a thorough cut of the area .of vegetation under the inner span area of the blade is obtained without increasing the rotational rate of the blade, which is otherwise necessary as explained above in the discussion of the conventional mowers. This reduces the overall drag, resulting in an appreciable power savings. This also allows mowing at a higher speed in large areas, such as highway medians that do not require a very precise cut.

It will be appreciated that the above-described features may be implemented during the manufacturing of mowers according to the invention. In addition, a significant advantage provided by the present invention is that it can be applied to preexisting mowers.

For example, with a method according to the invention, it is possible to remove a horizontal cutting blade and replace it with a support arm that includes downwardly projecting cutting elements, such as those described above. Alternatively, a conventional horizontal cutting blade may be modified to include the cutting elements positioned as described above. This can be achieved, for example, by adjusting the relative height of the blade, and then drilling or tapping holes along the preexisting cutting blade to fixedly attach cutting elements with conventional fasteners.

It has been discovered that by modifying a preexisting mower in this manner, it is possible to entirely replace a large internal combustion motor with a smaller, electric motor. This results in substantial power savings, reduced noise and air pollution, and increased maneuverability of the mower. It further provides an extremely inexpensive method by which older mowers may be renovated. For example, it allows one to refit a mower with a smaller internal combustion motor or electric motor when the original motor has worn out.

Figure 11A:
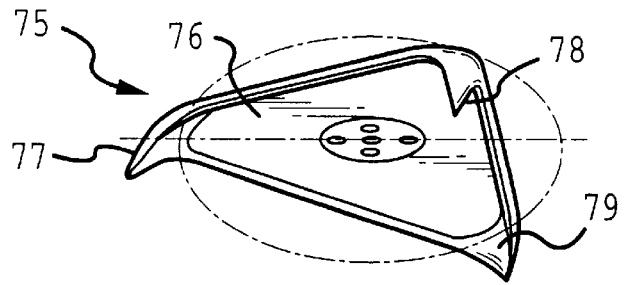
FIG. 11A is a bottom perspective view of a mower blade according to another embodiment of the present invention.

A mower blade 75 according to another embodiment of the present invention is shown in FIG. 11A. The mower blade 75 is formed from a thin, triangular-shaped plate member 76 and has cutting elements 77, 78, 79 formed at each corner of the plate member 76. The cutting elements 77, 78, 79 each have a sharpened leading edge inclined relative to a direction of rotation of the blade 75. The cutting elements 77, 78, 79 are also inclined outwardly at an angle (preferably between 20° and 60°) with respect to the vertical axis of rotation of the blade 75. The plate member 76 has an inner portion fixed to a drive shaft of the mower in a conventional manner using a hub assembly or the like. The plate member 76 thus provides a support structure for the cutting elements 77, 78, 79 without the need for a separate support arm, as in the other embodiments described above. The configuration shown in FIG. 11A is particularly suitable for small diameter and multiple mower blade arrangements.

As shown in FIG. 11A, the cutting elements 77, 78, 79 are each formed with a slight curvature having a radius centered about the axis of rotation of the blade 75. The curvature can be formed in the cutting elements 77, 78, 79 by, for example, stamp-forming the cutting elements at the corners of the plate member 76. The curvature in the cutting elements 77, 78, 79 reduces the amount of contact between the vegetation and the sides of the cutting elements, and thus, tends to minimize rotational drag of the blade 75 during operation. The curvature in the cutting elements 77, 78, 79 also increases the rigidity and overall strength of the blade 75. Additional ridges and/or small bends can be formed in the plate member 76, particularly around the edges thereof, as shown in FIG. 11A, to further increase the rigidity of the plate member 76.

A mower blade 80 according to another embodiment of the present invention is shown in FIGS. 11B to 13. The mower blade 80 is formed from a thin, triangular-shaped plate member 82 and has three projecting portions thereof bent downwardly to form a first set of cutting elements 84, 86, 88. The cutting elements 84, 86, 88 each have a sharpened leading edge inclined relative to a direction of rotation of the blade 80. The cutting elements 84, 86, 88 are also inclined outwardly at an angle a (preferably between 20° and 60°) with respect to the vertical axis of rotation 90 of the blade 80. The plate member 82 has an inner portion 92 fixed to a drive shaft 94 of the mower in a conventional manner using a hub assembly 96 or the like.

Figure 11B:
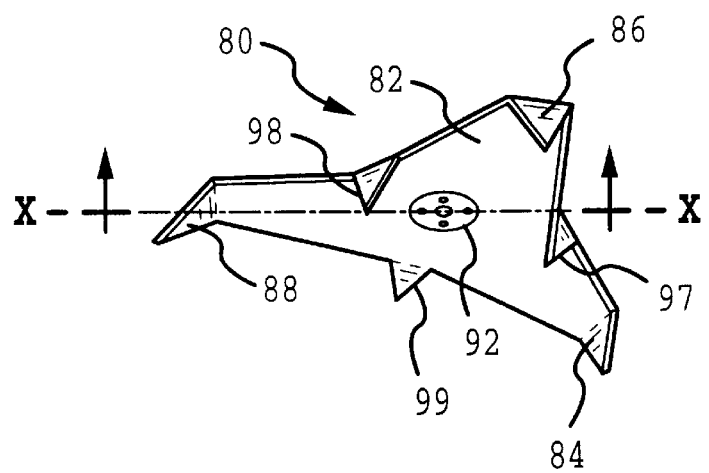
FIG. 11B is a bottom perspective view of a mower blade according to yet another embodiment of the present invention.
Figure 12:
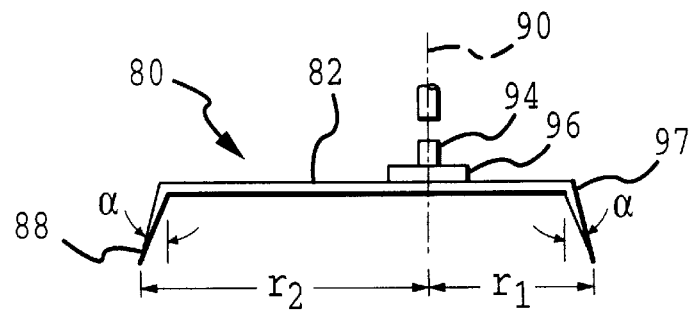
FIG. 12 is a cross-sectional side view of the mower blade shown in FIG. 11B as viewed along line X—X in FIG. 11B.

The plate member 82 shown in FIG. 11B further includes three inner projecting portions bent downwardly to form a second set of cutting elements 97, 98, 99. Each of the cutting elements 97, 98, 99 in the second set of cutting elements is diametrically opposed to a respective one of the cutting elements 84, 86, 88 in the first set of cutting elements. The cutting elements 97, 98, 99 each have a sharpened leading edge inclined relative to a direction of rotation of the blade 80. The cutting elements 97, 98, 99 are also inclined outwardly at an angle a (preferably between 20° and 60°) with respect to the vertical axis of rotation 90 of the blade 80. With the mower blade 80 according to this embodiment, the first set of cutting elements 84, 86, 88 traverse a cutting path having a radius of $r_1$, while the second set of cutting elements 97, 98, 99 traverse a cutting path having a radius of $r_2$, wherein $r_1 > r_2$.

Figure 13:
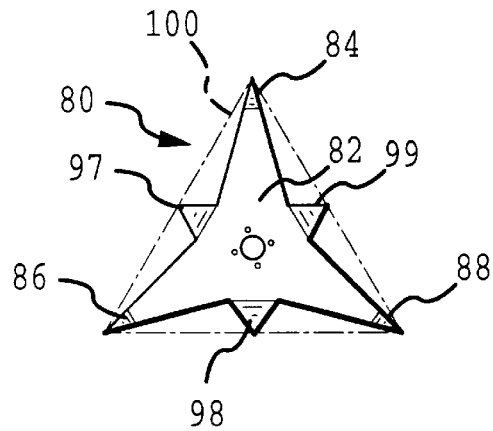
FIG. 13 is a bottom plan view of the mower blade shown in FIG. 11B, showing that the blade can be formed from a triangular-shaped plate.

As shown in FIG. 13, the mower blade 80 shown in FIG. 11B can be formed from a triangular-shaped plate 100 and bent or stamped into the desired shape in an efficient manner.

Figure 14A:
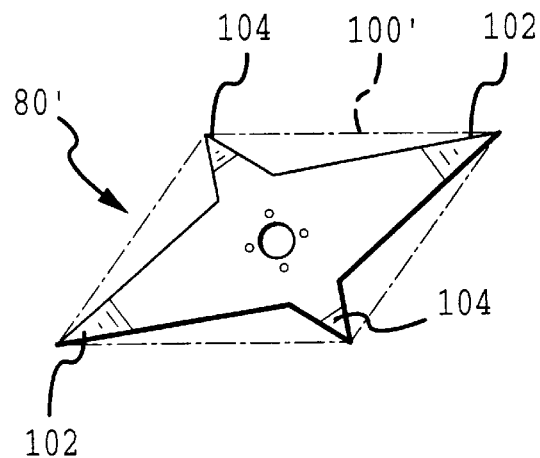
FIGS. 14A and 14B are bottom plan views of mower blades according to other embodiments of the present invention, wherein the blade is formed from a rhomboid-shaped plate and has two and three cutting diameters, respectively.

In an alternative embodiment shown in FIG. 14A, the mower blade 80 is formed from a thin, rhomboid-shaped plate 100' and has first and second pairs of cutting elements 102, 104. The first and second pairs of cutting elements 102, 104 are bent downwardly and traverse cutting paths having first and second radii, respectively. In this embodiment, the cutting elements 102 are diametrically opposed to each other, while the cutting elements 104 are diametrically opposed to each other. The angle and inclination of the cutting edges of the cutting elements 102, 104 are similar to that of the other embodiments described above.

Figure 14B:
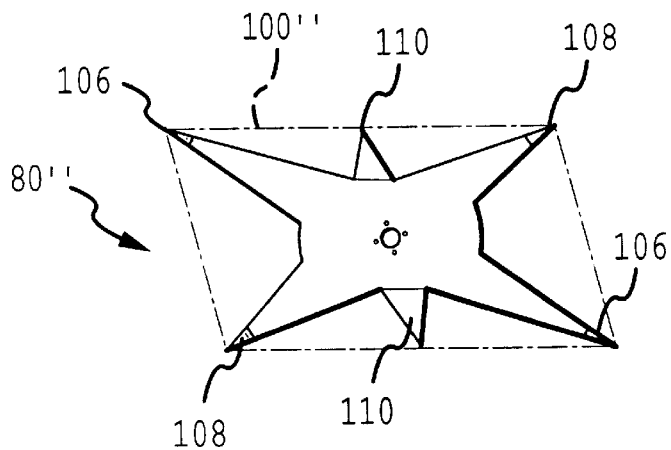

In a further embodiment shown in FIG. 14B, the mower blade 80" is formed from a thin, rhomboid-shaped plate 100" and has first, second and third pairs of cutting elements 106, 108, 110. The first, second and third pairs of cutting elements 106, 108, 110 are bent downwardly and traverse cutting paths having first, second and third radii, respectively. In this embodiment, the cutting elements 106 are diametrically opposed to each other, the cutting elements 108 are diametrically opposed to each other, and the cutting elements 110 are diametrically opposed to each other. The angle and inclination of the cutting edges of the cutting elements 106, 108, 110 are similar to that of the other embodiments described above.

Figure 15A:
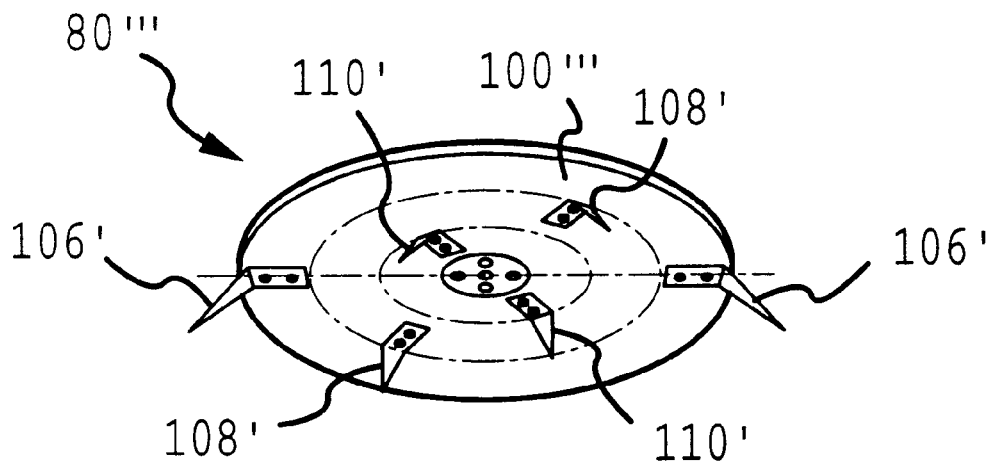
FIGS. 15A and 15B are bottom plan views of mower blades according to other embodiments of the present invention, wherein the supporting structure is formed from circular or polygonal plates, respectively, and has cutting elements attached thereto.

In a further embodiment shown in FIG. 15A, the mower blade 80''' is formed from a circular plate 100''' and has first, second and third pairs of cutting elements 106', 108', 110'. The first, second and third pairs of cutting elements 106', 108', 110' are attached to and extend downwardly from the circular plate 100''' and traverse cutting paths having first, second and third radii, respectively. In this embodiment, the cutting elements 106' are diametrically opposed to each other, the cutting elements 108' are diametrically opposed to each other, and the cutting elements 110' are diametrically opposed to each other. The angle and inclination of the cutting edges of the cutting elements 106', 108', 110' are similar to that of the other embodiments described above.

Figure 15B:
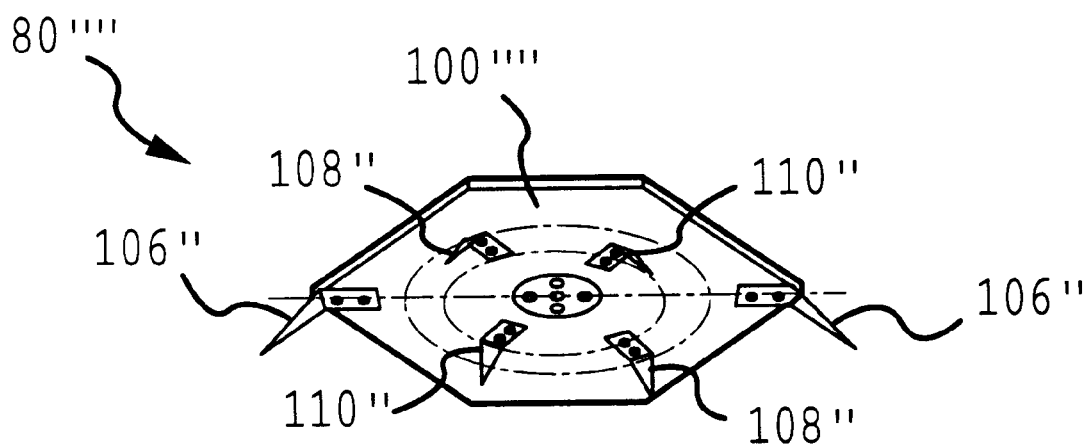

In a still further embodiment shown in FIG. 15B, the mower blade 80"" is formed from a hexagonal plate 100"" and has first, second and third pairs of cutting elements 106", 108", 110". The first, second and third pairs of cutting elements 106", 108", 110" are attached to and extend downwardly and traverse cutting paths having first, second and third radii, respectively. In this embodiment, the cutting elements 106" are diametrically opposed to each other, the cutting elements 108" are diametrically opposed to each other, and the cutting elements 110" are diametrically opposed to each other. The angle and inclination of the cutting edges of the cutting elements 106", 108", 110" are similar to that of the other embodiments described above.

Other variations in the shape and design of mower blades and support structures are possible based on the general principles and teachings provided herein. For example, the support structure can be formed from a thin, metal plate, such as stainless steel, or a disc made of a light material, such as plywood, plastic, or the like. The cutters can be formed integral with the support structure or attached thereto using a suitable fastener means. In general, the support structure can be a rotating disc or plate of any shape (e.g., circular, triangular, hexagonal, rhomboidal, and so forth), and the cutters can be formed integral with the support structure by, for example, bending or stamp-forming, or attached to the support structure using any suitable fastening means (e.g., bolts, welds, and so forth). The particular construction will depend, in part, on the particular application in which the blade assembly is to be used.

The plate shapes of the support structures described herein have the advantages of being better balanced, being less vulnerable to sharpening or other use-and-wear effects, and having a larger area to distribute the rotary cutters as desired. A circular, octagonal, or hexagonal plate covering most of the circle formed by the rotating cutters has the additional advantage of confining the clippings under the support structure, whereby additional cutting and shredding is automatically performed.

According to another aspect of the present invention, a mower assembly having multiple cutting blade assemblies is provided to achieve a better cutting and mulching efficiency, and a reduction in power requirements and energy consumption as compared to conventional mowers. The multiple cutting blade assemblies are preferably arranged over the width of the mower and provide an even coverage of the cutting elements over the cutting path width. The advantages of the multiple blade mower according to the present invention are particularly apparent when four or more cutting blade assemblies are spaced over the cutting path width of the mower.

Figure 16A:
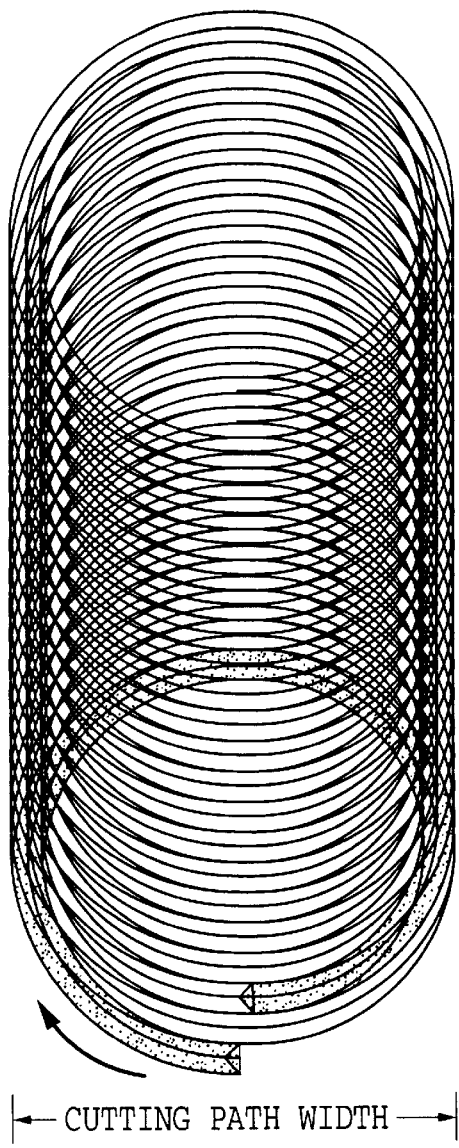
FIGS. 16A and 17A are comparative graphical illustrations of cutting paths obtained by a conventional cutting blade and a multiple blade mower assembly according to the present invention, respectively.
Figure 16B:
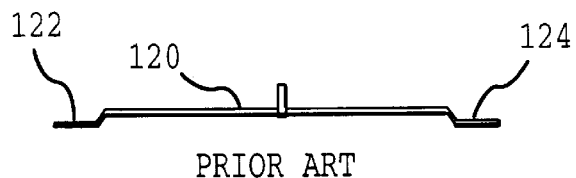
FIGS. 16B and 16C are a side view and plan view of the conventional mower blade used to generate the graphical illustration of FIG. 16A.
Figure 16C:
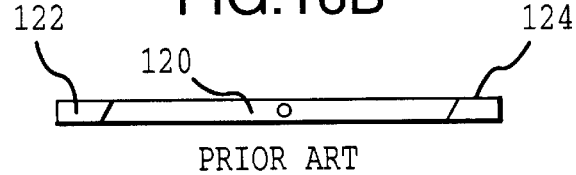
Figure 17A:
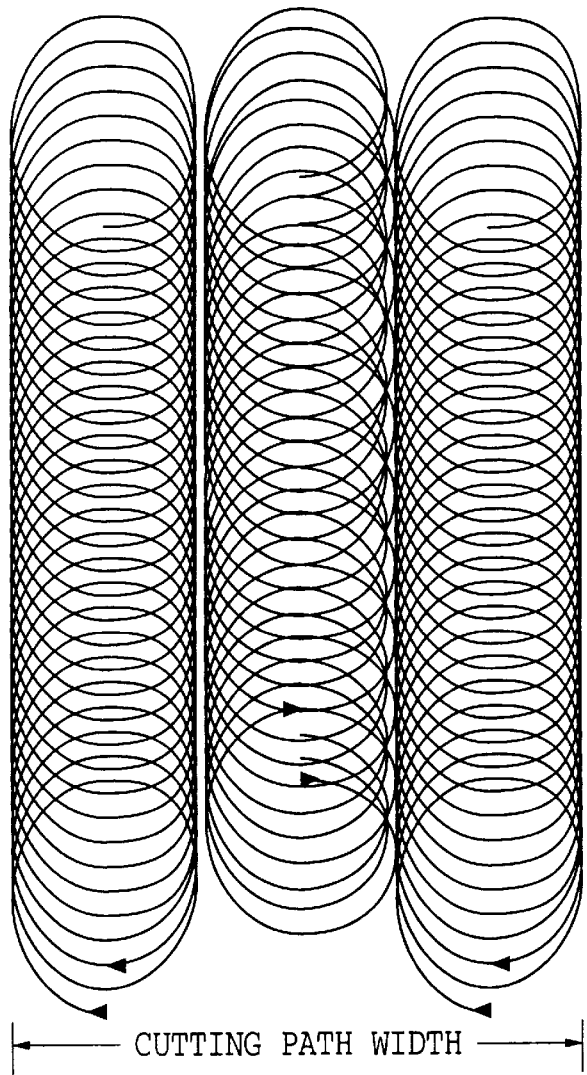
Figure 17B:
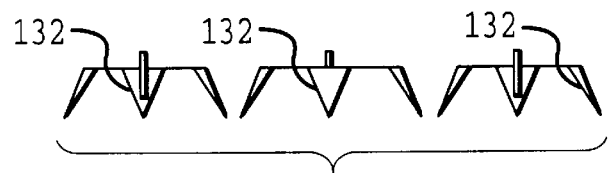
FIGS. 17B and 17C are a side view and bottom plan view of the mower blades used to generate the graphical illustration of FIG. 17A.
Figure 17C:
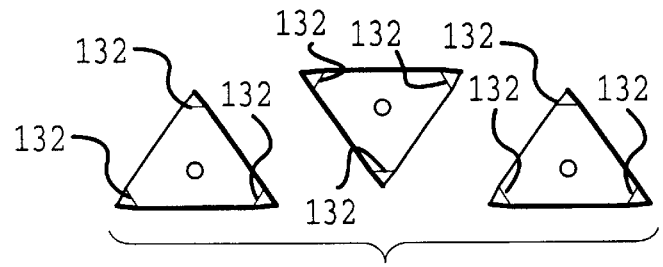

FIGS. 16A and 17A provide graphical illustrations of cutting paths obtained by a conventional mower blade 120 and a multiple blade mower assembly 130 according to the present invention, respectively. The conventional mower blade 120 having a cutting path represented by FIG. 16A is shown in FIGS. 16B and 16C in side and plan views, respectively, while the multiple blade mower assembly 130 having a cutting path represented by FIG. 17A is shown in FIGS. 17B and 17C in side and bottom plan views, respectively. The conventional mower blade 120 has first and second cutting edges 122, 124 that rotate in a horizontal plane during operation of the mower. As shown in FIG. 16A, the conventional blade 120 has a cutting path that has substantial overlap at the outer portions of the cutting path width. On the other hand, the cutting elements 132 of the multiple blade mower assembly 130 have cutting paths that are evenly distributed over a width of the mower with relatively little overlap.

Figure 18A:
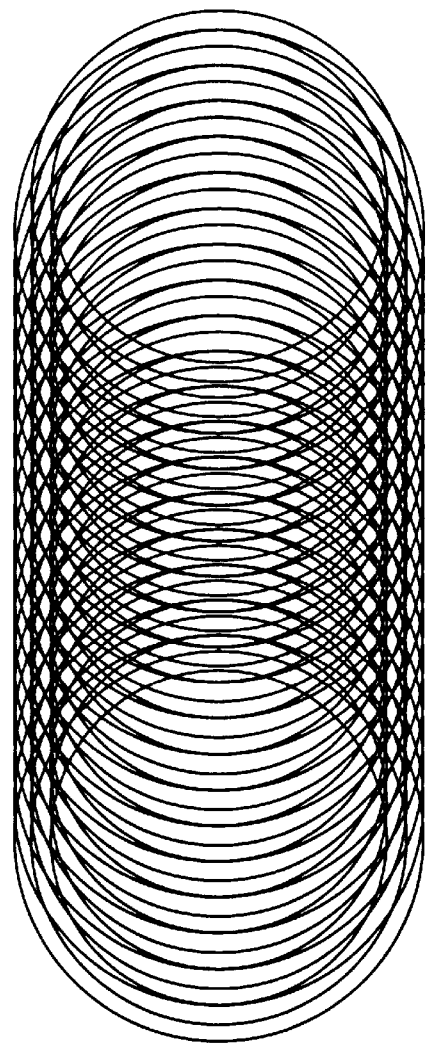
FIGS. 18A, 19A and 20A are comparative graphical illustrations of cutting paths obtained by mower blades having side view configurations as shown in FIGS. 18B, 19B and 20B, respectively.
Figure 18B:
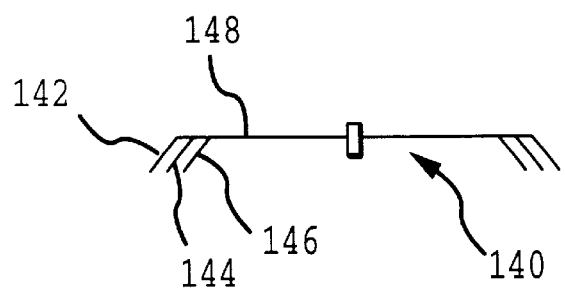
Figure 19A:
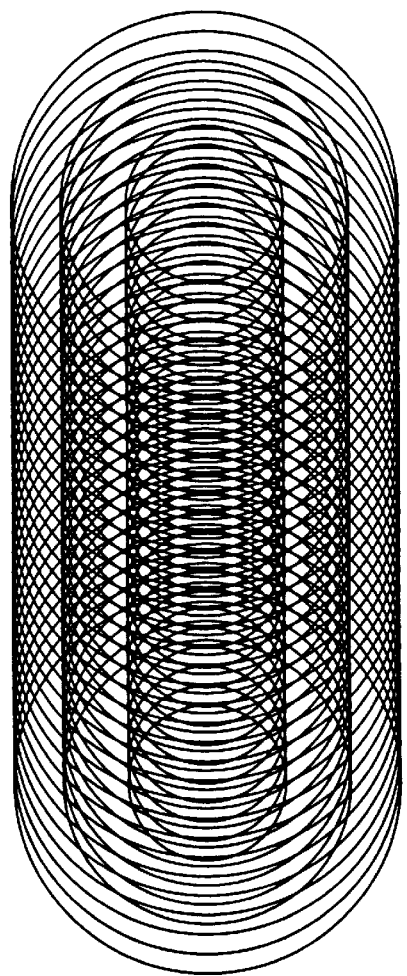
Figure 19B:
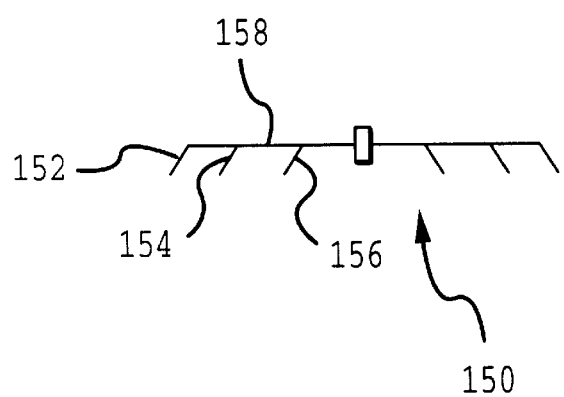
Figure 20A:
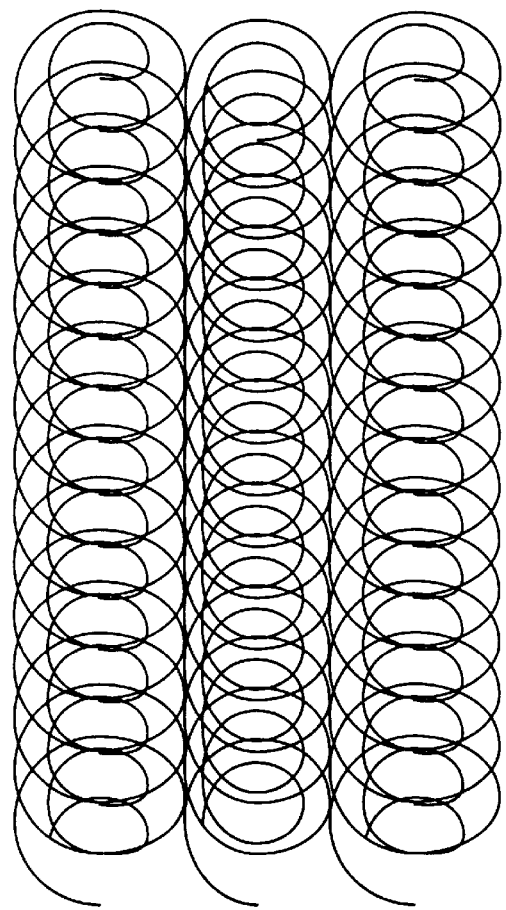
Figure 20B:
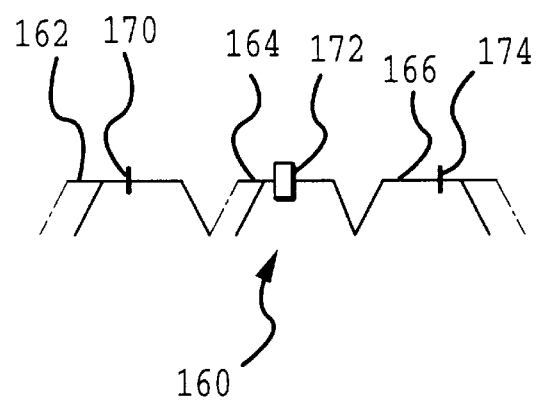

FIGS. 18A, 19A and 20A provide graphical illustrations of cutting paths obtained by mower blade arrangements having side view configurations as shown in FIGS. 18B, 19B and 20B, respectively. The mower blade arrangement 140 shown in FIG. 18B has three pairs of symmetrically positioned cutting elements 142, 144, 146 extending downwardly and outwardly from a support structure 148 near outer ends thereof. As shown in FIG. 18A, the cutting paths of the cutting elements 142, 144, 146 positioned as shown in FIG. 18B have considerable overlap near the outer portions of the width of the mower.

The mower blade arrangement shown in FIG. 19B also has three pairs of symmetrically positioned cutting elements 152, 154, 156 extending downwardly and outwardly from a support structure 158. However, the cutting elements 152, 154, 156 are spaced evenly over a length of the support structure 158. As shown in FIG. 19A, the cutting paths of the cutting elements 152, 154, 156 positioned as shown in FIG. 19B have less overlap near the outer portions of the width of the mower than the cutting paths shown in FIG. 18A.

The mower blade arrangement 160 shown in FIG. 20B has three mower blades 162, 164, 166 positioned side-by-side that are each driven by a respective drive shaft 170, 172, 174. The mower blades 162, 164, 166 can each have the structure shown in FIG. 11, for example, wherein the cutting elements define six cutting paths having two different diameters. As shown in FIG. 20A, the cutting paths of the cutting elements of the three mower blades 162, 164, 166 positioned as shown in FIG. 20B are generally uniform over the width of the mower with substantially less overlap than the cutting paths shown in FIGS. 18A and 19A (notice that there is a set of three cutters for each diameter, but the path of only one for each diameter is shown in FIG. 20A; other cutters will fill the blanks in between).

FIGS. 21, 22, 23, and 25 illustrate mower blade arrangements having multiple mower blades according to additional embodiments of the present invention. In these figures, a plurality of small mower blades according to the present invention are positioned in a side-by-side or staggered manner over the cutting width of the mower to take the place of a single conventional mower blade spanning the entire cutting width. By using a plurality of small rotary blades rather than a single large conventional blade, a mower having the same cutting width can be made with reduced drive power requirements, a more compact construction, and more uniform and regular coverage of the cutting area with the cutting elements (see, for example, FIG. 20A described above). Many possible variations in the arrangement and number of mower blades can be made according to this aspect of the present invention.

Figure 21:
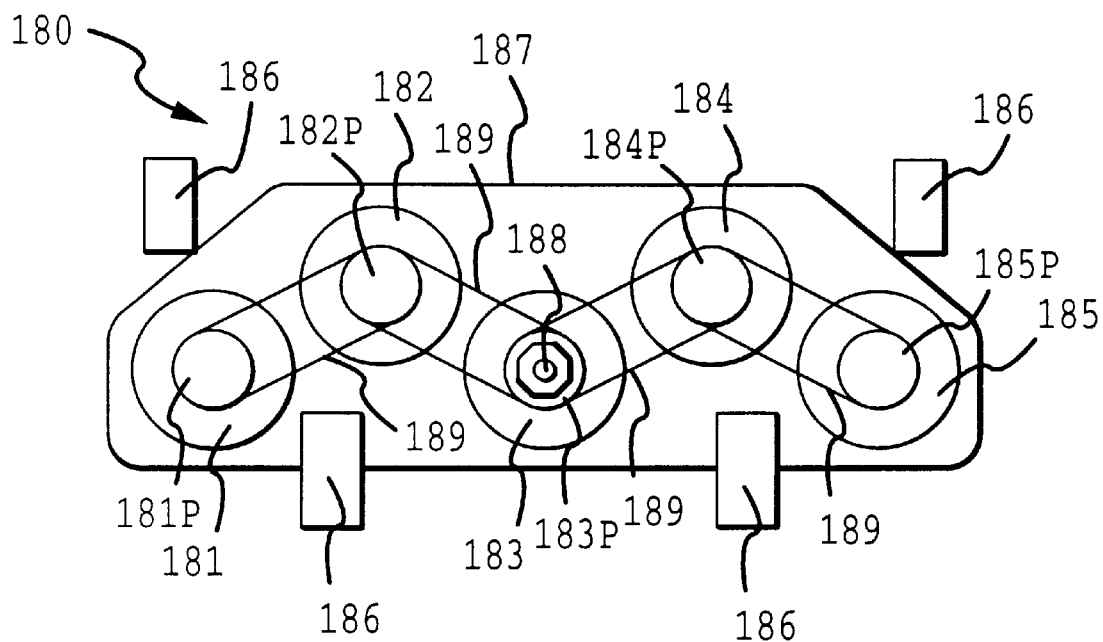
FIG. 21 is a plan view of a mower blade arrangement according to the present invention wherein five mower blades are positioned in a staggered manner over a cutting width.

For example, FIG. 21 is a plan view of a mower blade arrangement 180 wherein five small mower blades 181–185 depicted by circles are positioned in a staggered manner over a cutting width. The mower blade arrangement 180 shown in FIG. 21 includes a plurality of wheels 186 for supporting a deck 187 of the mower at a desired height above the ground. A drive shaft 188 at the center of the mower deck 187 is driven by a motor (not shown) through a suitable drive means, such as an endless belt or the like. The center drive shaft 188 is interconnected with respective pulleys 181p–185p for each mower blade 181–185 by endless belts or other suitable drive means.

Figure 22:
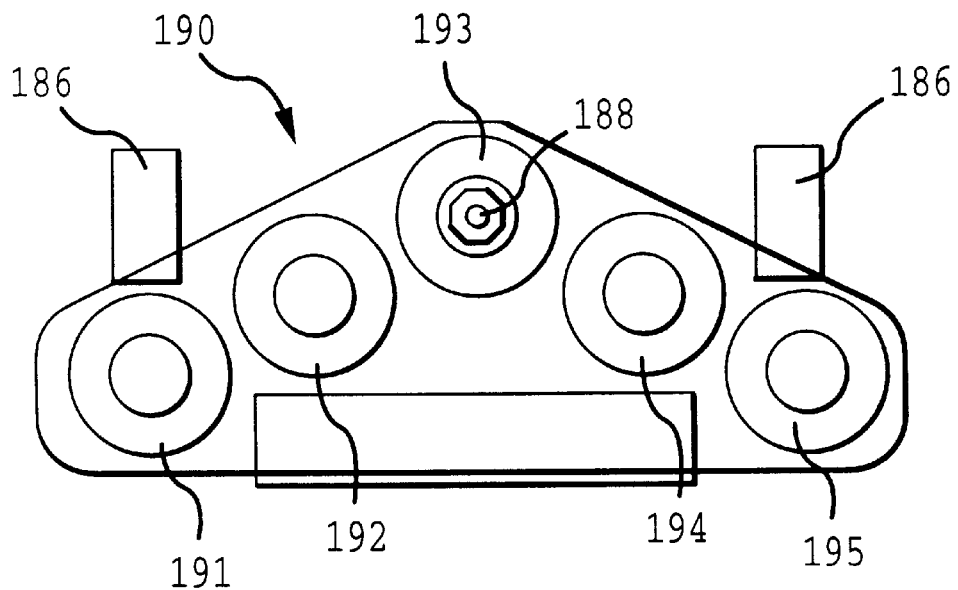
FIG. 22 is a plan view of a mower blade arrangement according to another embodiment of the present invention wherein five mower blades are positioned in a V-configuration.

FIG. 22 is a plan view of a mower blade arrangement 190 wherein five mower blades 191–195 are positioned such that their axes of rotation are in a generally V-shaped configuration in plan view over a cutting width of the mower. The elements in FIG. 22 common to those corresponding elements shown in FIG. 21 are identified with the same reference numerals and are not further described herein.

Figure 23:
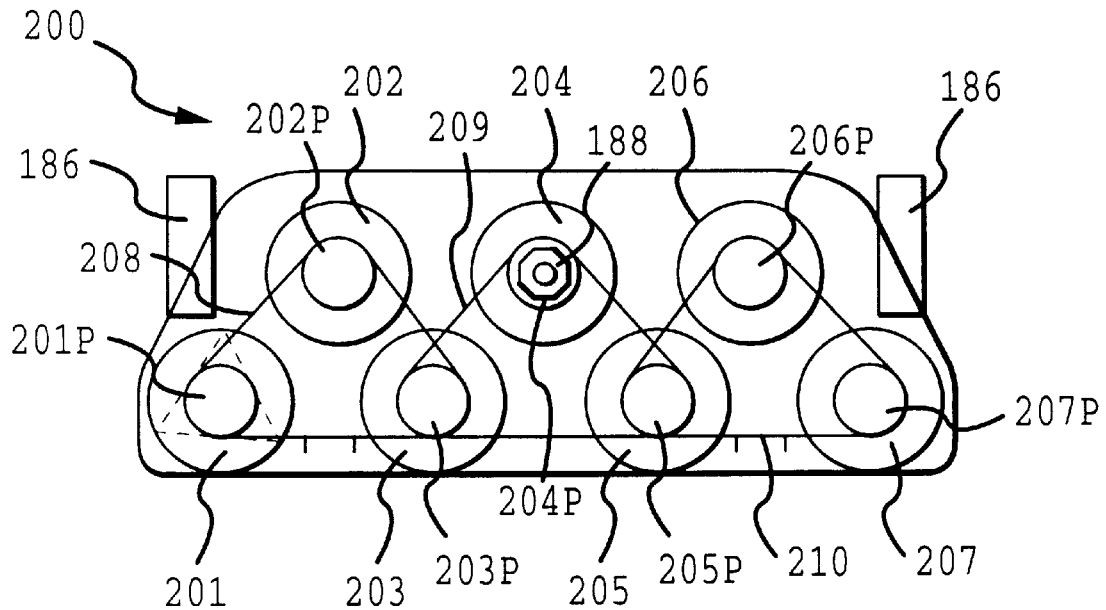
FIG. 23 is a plan view of a mower blade arrangement according to another embodiment of the present invention wherein seven mower blades are positioned in a staggered manner over a cutting width.

FIG. 23 is a plan view of a mower blade arrangement 200 wherein seven mower blades 201–207 are positioned in a staggered manner over a cutting width of the mower. The elements in FIG. 23 common to those corresponding elements shown in FIG. 21 are identified with the same reference numerals and are not further described herein. The respective pulleys 201p–207p for the mower blades 201–207 shown in FIG. 23 are interconnected by three endless belts 208, 209, 210 such that rotation of the center drive 188 causes the other six pulleys and respective mower blades to be rotated.

Figure 24:
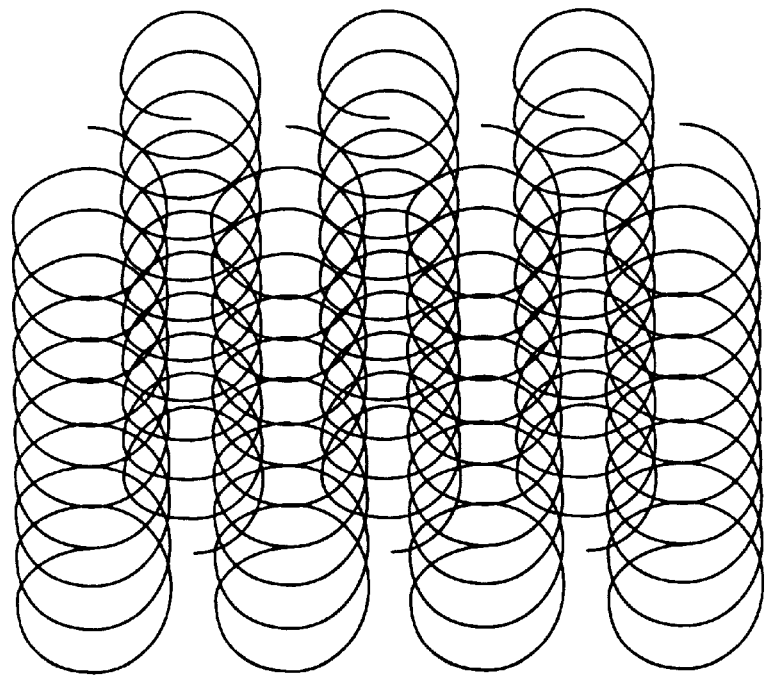
FIG. 24 is a graphical illustration of cutting paths obtained by the seven mower blades of the mower blade arrangement shown in FIG. 23.

The cutting paths obtained by the seven staggered mower blades 201–207 of the mower blade arrangement 200 shown in FIG. 23 are depicted in the graphical illustration of FIG. 24. As shown in FIG. 24, the cutting paths obtained by the staggered blade arrangement 200 of FIG. 23 have sufficient overlap to provide a generally uniform cut over the width of the mower. However, the overlap is distributed over the width of the mower, rather than just at the outer portions of the cut, as with conventional mower blades. A small overlapping of subsequent and previous passes of the mower blade arrangement shown in FIG. 24 will cause a uniform distribution of the cutting paths over the area to be mowed.

Figure 25:
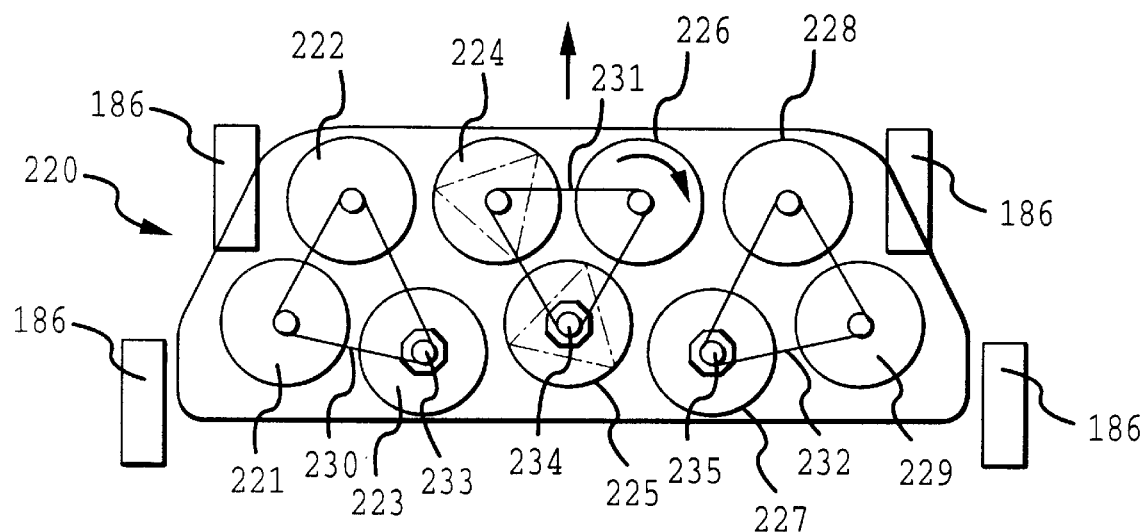
FIG. 25 is a plan view of a mower blade arrangement according to another embodiment of the present invention wherein nine mower blades are positioned in two overlapping rows over a cutting width.

FIG. 25 is a plan view of a mower blade arrangement 220 wherein nine mower blades 221–229 are positioned in two overlapping rows over a cutting width of the mower. The elements in FIG. 25 common to those corresponding elements shown in FIG. 21 are identified with the same reference numerals and are not further described herein. The respective pulleys for the mower blades shown in FIG. 25 are interconnected by endless belts 230, 231, 232 such that rotation of the three drive pulleys 233, 234, 235 causes the other six pulleys and respective mower blades to be rotated. Alternatively, all nine of the pulleys shown in FIG. 25 can be interconnected by endless belts so as to be driven from a single drive shaft.

Figure 26:
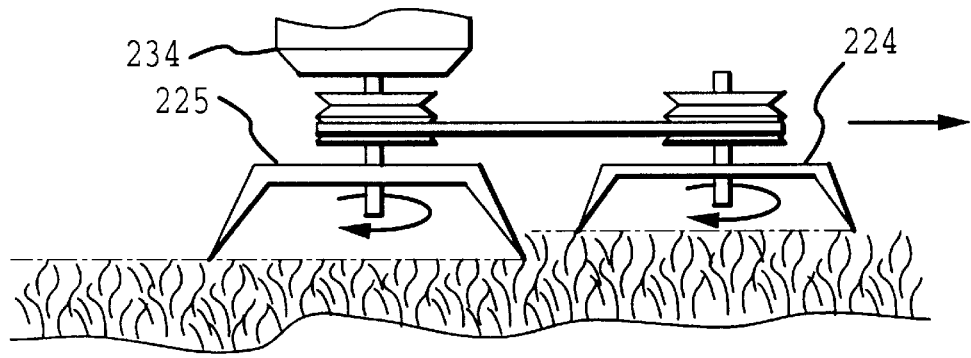
FIG. 26 is an enlarged side view of the two overlapping rows of mower blades in the mower blade arrangement shown in FIG. 25, wherein the mower blades in the front row are positioned at a slightly higher level.

As shown in FIG. 26, the mower blades 224 (and 222, 226 and 228) in the front leading row of the two overlapping rows shown in FIG. 25 can be adjusted by a suitable means to a slightly higher level than the mower blades 225 (and 221, 223, 227 and 229) in the rear row. Thus, the lower cutting tips of the blades in the front row are positioned at a higher elevation than the lower cutting tips of the blades in the rear row. The mower blades 222, 224, 226, 228 in the front leading row provide a function of precutting the vegetation, which results in a cleaner cut with better mulching and shredding. The mower blades 221 in the rear row provide a finishing cut at a slightly lower level.

Figure 27:
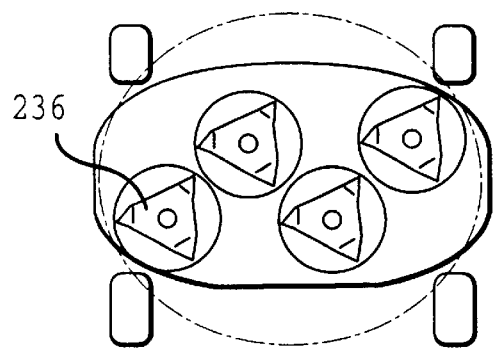
FIGS. 27 to 29 are bottom plan views of various mower blade arrangements, according to the present invention, wherein multiple blade assemblies are positioned under a deck of a push or walk-behind mower.
Figure 28:
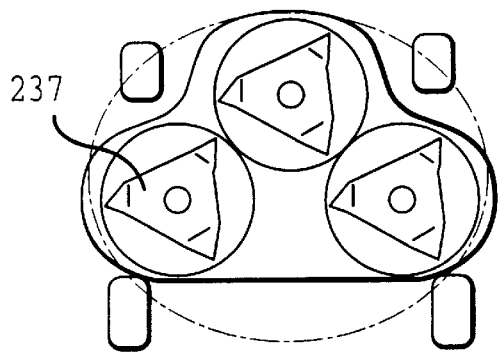
Figure 29:
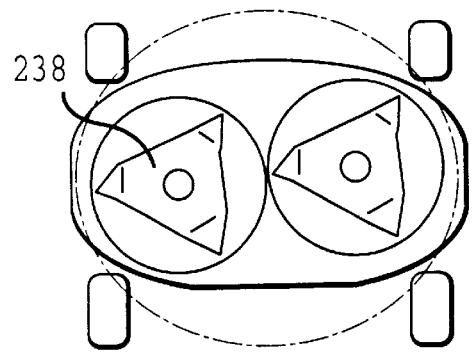

FIGS. 27 to 29 illustrate various arrangements of multiple blade assemblies that can be used, for example, with push or walk-behind mowers. The arrangement shown in FIG. 27 has four blade assemblies 236 positioned in a staggered manner over a width of the mower. The arrangement shown in FIG. 28 has three blade assemblies 237 positioned in a staggered manner over a width of the mower. The arrangement shown in FIG. 29 has two blade assemblies 238 positioned generally side-by-side in a slightly staggered manner.

The blade assemblies shown in FIGS. 27 to 29 can each be driven by an individual motor, or by a suitable drive connection (e.g., endless belt and pulleys) between each motor and two or more of the blade assemblies. In each of these mower arrangements, the multiple blade assemblies reduce the power and energy consumption requirements as compared with conventional mowers having the same cutting width, and as compared with mowers having only a single blade assembly with downwardly protruding cutters according to the present invention. The reduced power and energy consumption of the multiple blade assemblies results mainly from a reduced area covered by the rotating blades (i.e., smaller diameter circles), a more uniform covering of the cutting path width by the cutting edges of the blades, and the use of cutters that operate with a smaller torque than larger blade assemblies.

The reduced power and energy consumption of the multiple blade assemblies permit smaller motors to be used for a given cutting width. For example, a 20 to 24 inch conventional mower would normally use a 3.5 to 6 HP engine, while a 20 to 24 inch mower having multiple blade assemblies (e.g., two to four blades 6 to 12 inches in diameter) with downwardly protruding cutters according to the present invention would require a total power supply of less than 2 HP. This allows more flexibility in the use of electric motors, particularly battery or solar powered motors, and thus, promotes the use of renewable energy and compliance with clean air regulations. As a further example, a 26 to 36 inch mower having multiple blade assemblies with downwardly protruding cutters according to the present invention could be equipped with a 3.5 to 4 HP engine that would normally only be suitable for mowers having much smaller cutting widths.

Figure 30:
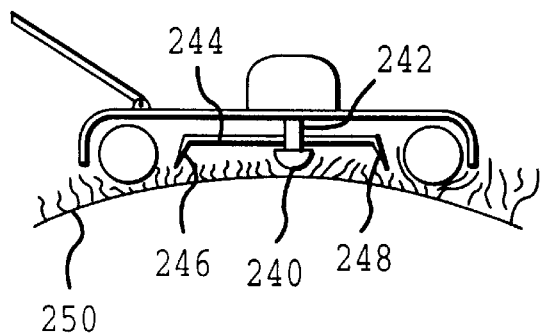
FIG. 30 is a side view of a rotary mower according to another aspect of the present invention, wherein a blunt extension is fixed to the rotating drive shaft for maintaining a uniform cutting height of the blade in uneven terrain.

FIGS. 30 to 36 illustrate additional embodiments of the present invention, wherein a blunt extension 240 is fixed to a rotating drive shaft 242 of the mower for maintaining a uniform cutting height of the mower blade 244 in uneven terrain. As shown in FIG. 30, the blunt extension 240 is fixed to a lower end of the rotating drive shaft 242 such that a lowermost portion of the blunt extension 240 is at approximately the same height as the lower cutting tips 246, 248 of the mower blade 244. Thus, the blunt extension 240 normally rotates with the drive shaft 242 at a level at or above the height of the vegetation cut by the mower blade 244. However, when the mower traverses uneven terrain, as depicted in FIG. 30, the blunt extension 240 comes into contact with the vegetation or the ground surface and prevents the cutting tips 246, 248 of the mower blade 244 from gouging into the ground surface. The blunt extension 240 preferably has a generally smooth lower surface that does not damage or disturb the ground surface 250 when it comes into contact therewith. Thus, the irregularities in terrain that pass between the wheels of the mower are contacted by the blunt extension 240 to maintain the mower blade 244 at a desired height above the ground surface 250.

Figure 31:
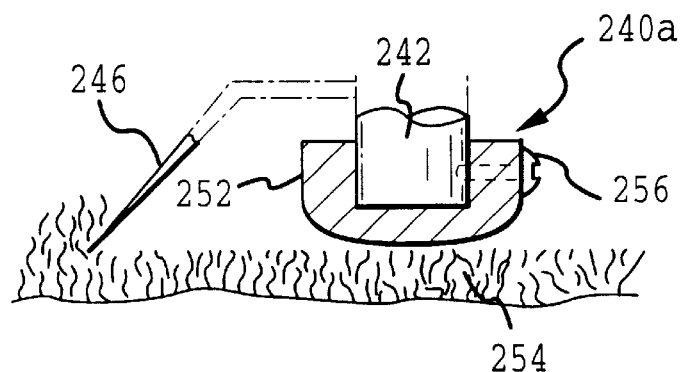
FIG. 31 is an enlarged cross-sectional view of a blunt extension fixed to the rotating drive shaft according to one embodiment of the present invention.

FIGS. 31 to 36 illustrate variations in the structure of the blunt extension according to the present invention. FIG. 31 is an enlarged cross-sectional view of a blunt extension 240a in the form of a collar 252 having a rounded bottom 254 defining a generally convex shape, which is secured to the lower end of the drive shaft 242 using a threaded set screw 256 or other suitable fastening means. The rounded bottom 254 of the collar 252 is positioned at approximately the same height as the lower cutting tips 246, 248 of the mower blade 244 during normal operation.

Figure 32:
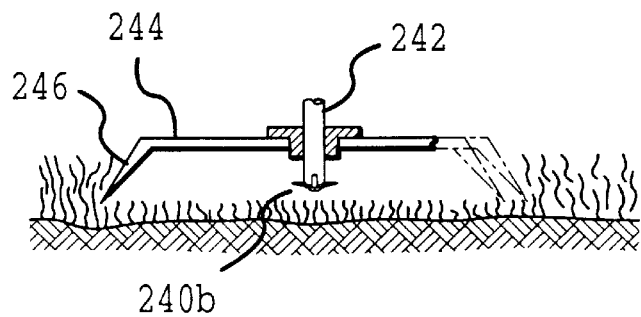
FIG. 32 is a cross-sectional side view of a mower assembly having a blunt extension fixed to the rotating drive shaft according to another embodiment of the present invention.
Figure 33:
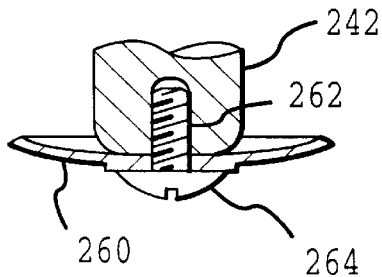
FIG. 33 is an enlarged cross-sectional side view of the blunt extension shown in FIG. 32.

FIGS. 32 and 33 show another variation in a structure of a blunt extension 240b, wherein a washer 260 having a convex shape is secured to the lower end of the drive shaft 242. The washer 260 has a center opening through which a threaded screw fastener 262 extends, the fastener 262 having a rounded head 264. As shown in FIG. 32, the bottom of the rounded head 264 of the threaded screw 262 is positioned at approximately the same height as the lower cutting tip 246 of the mower blade 244 during normal operation. The washer 260 together with the rounded head 264 of the fastener 262 define a generally convex shape on a side thereof facing the ground.

Figure 34:
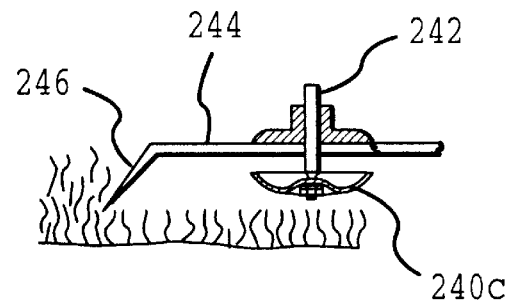
FIG. 34 is a cross-sectional side view of a mower assembly having a blunt extension fixed to the rotating drive shaft according to yet another embodiment of the present invention.
Figure 35:
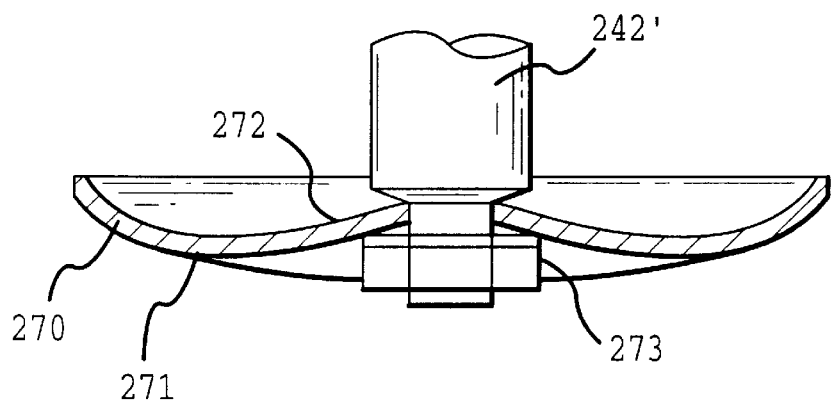
FIG. 35 is an enlarged cross-sectional side view of the blunt extension shown in FIG. 34.

FIGS. 34 and 35 show another variation in a structure of a blunt extension 240c, wherein a washer 270 having a center opening is formed with a generally convex shape at an outer portion 271 and a concave shape at an inner portion 272. This arrangement is particularly suitable where the lower end of the drive shaft 242' is threaded and a hex nut 273 or the like is used to secure the washer 270 to the shaft 242'. This arrangement is also suitable where a threaded fastener (not shown) having a hex head is used to secure the washer 270 to the shaft 242'. The shape of the washer 270 is such that the hex nut 272 or hex head of the fastener are received within a recess formed by the concave portion 272 of the washer 270 so that the overall shape of the surface of the blunt extension 240c facing the ground is generally convex. The operation of this embodiment is generally similar to the operation of the other blunt extension embodiments described above.

Figure 36:
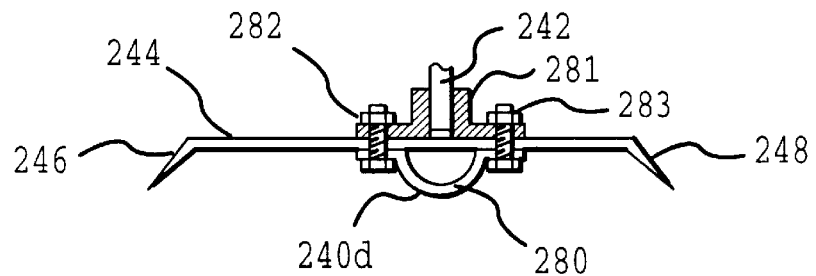
FIG. 36 is a cross-sectional side view of a mower assembly having a blunt extension fixed to the rotating drive shaft according to a further embodiment of the present invention.

FIG. 36 shows another variation in a structure of a blunt extension 240d, wherein a convex plate member 280 having openings spaced around an outer periphery thereof is fixed to a hub assembly 281 to which the mower blade 244 is fixed. The plate member 280 is preferably attached to the hub assembly 281 using the same fasteners 282, 283 used to fasten the mower blade 244 to the hub assembly 281. A convex portion of the plate member 280 defines the lowermost portion of the blunt extension 240d, which is positioned at approximately the same height as the lower cutting tip 246 of the mower blade 244 during normal operation. This arrangement is particularly suitable where the blunt extension 240d is added to the mower at the same time as an improved blade assembly according to the present invention is added to the mower. The operation of this embodiment is generally similar to the operation of the other blunt extension embodiments described above.

In a still further variation in the structure of the blunt extension, a member having a concave lower surface is attached to the drive shaft with a bearing assembly to permit the concave member to rotate freely relative to the drive shaft. With this arrangement, the concave member will rotate with the drive shaft during normal operation, but will stop rotating when engaged with the ground surface of uneven terrain. Because the concave member stops rotating when it is engaged with the ground surface, the possibility of damage or disturbance of the ground surface is reduced.

The lower end of the drive shaft itself can also be used as the blunt extension according to the present invention by positioning the lower end of the drive shaft at approximately the same height as the lower tips of the cutting elements of the blade assembly. However, the embodiments described above, wherein a convex surface is provided on a lower side facing the ground, are preferable to this embodiment for minimizing damage and disturbance to the soil surface during operation.

Figure 37:
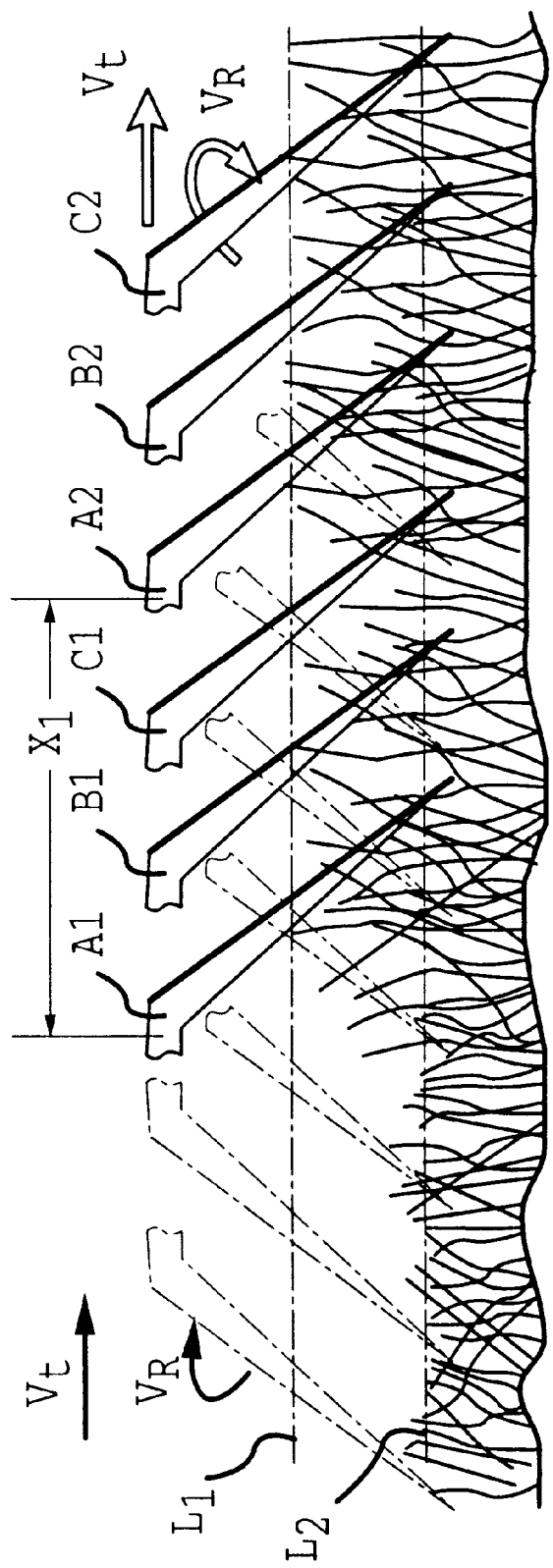
FIG. 37 is a side view illustration showing a repetitive cutting action of the downwardly protruding cutters of the present invention for mulching.

The mulching action of the blade assemblies having downwardly protruding cutters according to the present invention will be better understood by reference to FIG. 37 of the drawings. In FIG. 37, three downwardly protruding cutters are represented by reference characters A, B and C. The cutters A, B and C, which are shown in side view as they pass over the center axis of the cutting path width, extend downwardly and outwardly from a support structure, as explained above. The cutters A, B and C are rotated at a rotational speed $V_R$ about an axis of rotation, while the mower is moved at a translational speed $V_T$. The same cutters A, B and C are shown in dotted lines as they pass over the center axis at a rear of the mower 180 degrees later. $L_1$ and $L_2$ represent the approximate level of grass or vegetation before and after it is cut, respectively. $X_1$ represents a translational distance covered by the mower in one turn of the blade assembly. This distance $X_1$ is variable according to the rotational speed $V_R$ and translational speed $V_T$ of the blade assembly. As shown in FIG. 37, the second and third cutters B and C fill the gap between each pass of the first cutter A, thereby increasing the cutting and shredding of the grass or vegetation.

In the present invention, the downwardly protruding cutting edges perform repetitive cutting of the vegetation for mulching while the vegetation is still adhered to its sprouts or roots. The mower assemblies according to the present invention can be easily adjusted to perform more or less shredding to adapt to the particular area to be mowed or mulched. Such adjustments can be factory made according to the intended use of the mower, or made on-site by the user of the mower. For example, the number of protruding cutters at each radial distance can be increased to increase the repetitive cutting performed by each blade assembly. Alternatively, the overlap between smaller modular blades can be increased, or small differences in the cutting height of the lower tips of the cutters can be provided to increase the repetitive cutting performed by each blade assembly. The user of the mower can also control the grade of shredding and finish of his or her work by simply selecting the translational speed $V_T$ of mowing, which directly affects the size of clippings and quality of shredding. For example, a well-cared for small yard or golf course can be mowed at a slower speed than a roadside or large park, where speed of mowing and energy savings is comparatively more important than the quality or finish of the mowed area.

As can be appreciated from the foregoing description, many variations and alternative arrangements can be utilized without departing from the spirit and scope of the present invention. For example, while it has been found that an optimum number of two to four pairs of cutting elements for each blade assembly should be used when about a twenty-inch cutting width is desired for each blade, this number can be increased for larger mowers or when lower rotational speeds are utilized. Also, the number of cutting pairs can be reduced for smaller mower blades. Further, although portions of the Applicant's disclosure describe and illustrate push or walk-behind mowers, it should be appreciated that the blade assemblies described herein are applicable to all kinds of mowers.

Other changes and modifications can be made without departing from the spirit and scope of the invention. It should therefore be understood that this description is merely illustrative of the invention as particularly set forth in the appended claims.

What is claimed is:

1. A blade assembly for a rotary mower, comprising:
   a rotating support structure having means for attaching to a rotary drive shaft at a height sufficient to substantially avoid contact of the support structure with vegetation to be cut by the blade assembly, the support structure being rotatable about an axis; and
   a plurality of cutting elements projecting downwardly from the support structure and radially outwardly relative to said axis of the support structure, each cutting element extending from said support structure a distance such that the cutting elements are positioned at a sufficient height to avoid contact with the ground, said cutting elements each having a sharpened leading edge for cutting vegetation, said sharpened leading edges of said cutting elements each being disposed at an angle relative to said axis of rotation of not more than 60° and providing the only sharpened surfaces of the blade assembly for cutting vegetation.

2. The blade assembly according to claim 1, wherein each cutting element is generally planar and said sharpened leading edge is configured to facilitate dropping of cut vegetation as the support structure is rotated about said axis.

3. The blade assembly according to claim 1, wherein the sharpened leading edges of the cutting elements are each disposed at an angle relative to the axis of rotation of the support structure of between 20° and 60°.

4. The blade assembly according to claim 1, wherein said plurality of cutting elements extend from the support structure at varying radial distances from the axis of rotation of the support structure.

5. The blade assembly according to claim 1, wherein the support structure comprises a plate member having a first plurality of projections that extend downwardly and radially outwardly relative to the axis of rotation to form a first set of said cutting elements.

6. The blade assembly according to claim 5, wherein the plate member further comprises a second plurality of projections that extend downwardly and radially outwardly relative to the axis of rotation to form a second set of said cutting elements, said first set of cutting elements being located a first distance from said axis of rotation, and said second set of cutting elements being located a second distance from said axis of rotation, said first distance being greater than said second distance.

7. The blade assembly according to claims 6 wherein the projections forming said first set of cutting elements are diametrically opposed to each other, and the projections forming said second set of cutting elements are diametrically opposed to each other.

8. The blade assembly according to claim 6, wherein the plate member further comprises a third plurality of projections that extend downwardly and radially outwardly relative to the axis of rotation to form a third set of said cutting elements, said third set of cutting elements being located a third distance from said axis of rotation, said second distance being greater than said third distance.

9. The blade assembly according to claim 1, wherein said plurality of cutting elements have different lengths so as to extend from the support structure to varying heights above the ground.

10. A blade assembly for a rotary mower, comprising:
   a rotating support structure having means for attaching to a rotary drive shaft at a height sufficient to substantially avoid contact of the support structure with vegetation to be cut by the blade assembly, the support structure being rotatable about an axis; and
   a plurality of cutting elements projecting downwardly from the support structure and radially outwardly relative to said axis of the support structure, each cutting element extending from said support structure a distance such that the cutting elements are positioned at a sufficient height to avoid contact with the ground, said cutting elements each having a sharpened leading edge for cutting vegetation;
   wherein said plurality of cutting elements extend from the support structure asymmetrically at varying distances from the axis of rotation of the support structure, and counterweight means are provided on the support structure to balance the support structure during rotation.

11. A blade assembly for a rotary mower, comprising:
a rotating support structure having means for attaching to a rotary drive shaft at a height sufficient to substantially avoid contact of the support structure with vegetation to be cut by the blade assembly, the support structure being rotatable about an axis; and
a plurality of cutting elements projecting downwardly from the support structure and radially outwardly relative to said axis of the support structure, each cutting element extending from said support structure a distance such that the cutting elements are positioned at a sufficient height to avoid contact with the ground, said cutting elements each having a sharpened leading edge for cutting vegetation;
wherein the support structure comprises a generally triangular-shaped plate member having three projections that extend downwardly and radially outwardly relative to the axis of rotation to form a first set of said cutting elements.

12. The blade assembly according to claim 11, wherein the plate member further comprises three additional projections that extend downwardly and radially outwardly relative to the axis of rotation to form a second set of said cutting elements, said first set of cutting elements being located a first distance from said axis of rotation, and said second set of cutting elements being located a second distance from said axis of rotation, said first distance being greater than said second distance.

13. The blade assembly according to claim 12, wherein each of the projections forming said second set of cutting elements is diametrically opposed to a respective one of the projections forming said first set of cutting elements.

14. A blade assembly for a rotary mower, comprising:
a rotating support structure having means for attaching to a rotary drive shaft at a height sufficient to substantially avoid contact of the support structure with vegetation to be cut by the blade assembly, the support structure being rotatable about an axis; and
a plurality of cutting elements projecting downwardly from the support structure and radially outwardly relative to said axis of the support structure, each cutting element extending from said support structure a distance such that the cutting elements are positioned at a sufficient height to avoid contact with the ground, said cutting elements each having a sharpened leading edge for cutting vegetation;
wherein said plurality of cutting elements comprises at least three cutting elements projecting from said support structure at three respective distances from said axis of rotation, and wherein two of said cutting elements located farthest from said axis of rotation are positioned closer to each other than two of said cutting elements located closest to said axis of rotation.

15. A blade assembly for a rotary mower, comprising:
a rotating support structure having means for attaching to a rotary drive shaft at a height sufficient to substantially avoid contact of the support structure with vegetation to be cut by the blade assembly, the support structure being rotatable about an axis; and
a plurality of cutting elements projecting downwardly from the support structure and radially outwardly relative to said axis of the support structure, each cutting element extending from said support structure a distance such that the cutting elements are positioned at a sufficient height to avoid contact with the ground, said cutting elements each having a sharpened leading edge for cutting vegetation;
wherein said plurality of cutting elements each has a curvature centered about the axis of rotation, said curvature corresponding generally with a rotational path of the respective cutting element.

16. A rotary mower having reduced power requirements and energy consumption, comprising:
a frame supported by a plurality of wheels;
a drive shaft having a longitudinal axis disposed substantially perpendicularly with respect to an area of vegetation to be mowed, said drive shaft being rotatably driven by a power supply; and
a first blade assembly comprising a support structure and a plurality of cutting elements, said support structure being fixedly connected to said drive shaft at a height sufficient to substantially avoid contact of the support structure with vegetation to be cut by the mower, said drive shaft rotating the support structure about said longitudinal axis of said drive shaft, and said plurality of cutting elements projecting downwardly from the support structure and radially outwardly relative to said axis, each cutting element extending from said support structure a distance such that the cutting elements are positioned at a sufficient height to avoid contact with the ground, said cutting elements each having a sharpened leading edge for cutting vegetation, said sharpened leading edges of said cutting elements each being disposed at an angle relative to said axis of not more than 60° and providing the only sharpened surfaces of the blade assembly for cutting vegetation, whereby vegetation is cut as the blade assembly rotates and moves forward across said area of vegetation.

17. The rotary mower as set forth in claim 16 further comprising a plurality of blade assemblies each having generally the same structure as said first blade assembly, said plurality of blade assemblies being spaced over a cutting width of said mower.

18. The rotary mower as set forth in claim 17, wherein said plurality of blade assemblies are positioned in a staggered manner across the cutting width of the mower.

19. The rotary mower as set forth in claim 17, wherein said plurality of blade assemblies each have an axis of rotation, said axes of rotation forming a single V-shaped configuration in plan view over the cutting width of the mower.

20. The rotary mower as set forth in claim 17, wherein said plurality of blade assemblies are positioned so as to form a front row of blade assemblies and a rear row of blade assemblies, the cutting elements of each of the blade assemblies having lower cutting tips, wherein the lower cutting tips of the blade assemblies in the front row are positioned at a higher elevation than the lower cutting tips of the blade assemblies in the rear row.

21. The rotary mower as set forth in claim 16, further comprising a blunt extension provided at a lower end of said drive shaft, said blunt extension having a lowermost portion positioned at approximately the same height as a lower cutting tip of said cutting elements.

22. The rotary mower as set forth in claim 21, wherein a lower surface of said blunt extension facing the ground has a generally convex shape.

23. The rotary mower as set forth in claim 21, wherein said blunt extension comprises a collar fit over a lower end of said drive shaft, said collar having a generally convex shape on a lower side thereof facing the ground.

24. The rotary mower as set forth in claim 21, wherein the blunt extension comprises a washer having a center opening through which a fastener extends to secure the washer to a lower end of said drive shaft, said washer defining a generally convex shape on a side thereof facing the ground.

25. The rotary mower as set forth in claim 21, wherein the blunt extension comprises a plate member having openings spaced around an outer periphery for fixing the blunt extension to a hub connected to said drive shaft, and wherein a convex portion of said plate member defines said lowermost portion within said outer periphery.

26. A method of reducing rotational and translational drag in a rotary mower, comprising the steps of:

removing a first substantially planar cutting blade formerly attached to a rotary drive shaft of said mower; and replacing said first cutting blade with a second blade assembly;

wherein said second blade assembly includes:

a support structure fixedly attached to the rotary drive shaft at a height sufficient to substantially avoid contact with vegetation to be cut by the second blade assembly, the rotary drive shaft rotating the support structure about an axis; and a plurality of cutting elements projecting downwardly from the support structure and radially outwardly relative to said axis, each cutting element extending from said support structure to a distance such that the cutting elements are positioned at a sufficient height to avoid contact with the ground, said cutting elements each having a sharpened leading edge for cutting vegetation, said sharpened leading edges of said cutting elements each being disposed at an angle relative to said axis of not more than 60° and providing the only sharpened surfaces of the blade assembly for cutting vegetation, whereby vegetation is cut as the second blade assembly rotates and moves forward across an area of vegetation.

27. The method according to claim 26, further comprising the step of replacing an original power source which rotates said rotary drive shaft with a substitute power source that operates at a substantially reduced power level as compared with the original power source.

28. The method according to claim 27, wherein said original power source is an internal combustion motor and said substitute power source is an electric motor, and said replacing step comprises replacing said internal combustion motor with said electric motor.

29. The method according to claim 26, wherein the support structure of the second blade assembly used to replace the first blade comprises a plate member having a plurality of projections that extend downwardly and radially outwardly relative to said axis to form said cutting elements.

30. The method according to claim 26, further comprising the steps of replacing said first blade with a plurality of blade assemblies each having generally the same structure as said second blade assembly, said plurality of blade assemblies being positioned across a cutting width of said mower.

31. The method according to claim 26, further comprising the step of providing a blunt extension at a lower end of said drive shaft, said blunt extension having a lowermost portion positioned at approximately the same height as a lower cutting tip of said cutting elements of the second blade assembly.

* * * * *